United States Patent [19]

Le et al.

[11] Patent Number: 6,079,001

[45] Date of Patent: Jun. 20, 2000

[54] METHOD FOR ACCESSING MEMORY USING OVERLAPPING ACCESSES AND EARLY SYNCHRONOUS DATA TRANSFER CONTROL

[75] Inventors: Chinh H. Le; Gerald E. Vauk, Jr., both of Austin, Tex.

[73] Assignee: Motorola Inc., Schaumburg, Ill.

[21] Appl. No.: 08/868,622

[22] Filed: Jun. 4, 1997

Related U.S. Application Data

[60] Continuation of application No. 08/353,764, Dec. 12, 1994, abandoned, which is a division of application No. 08/298,892, Aug. 31, 1994, Pat. No. 5,727,005.

[51] Int. Cl.[7] .................................................. G06F 13/00
[52] U.S. Cl. ........................ 711/167; 711/169; 711/170; 365/230.06; 713/400
[58] Field of Search .................................. 395/559, 800.4, 395/494, 496; 711/767, 169, 167, 170; 713/400, 600; 365/230.06

[56] References Cited

U.S. PATENT DOCUMENTS

| | | | |
|---|---|---|---|
| 5,151,986 | 9/1992 | Langan et al. ............................ | 395/550 |
| 5,167,025 | 11/1992 | Kusakabe ................................ | 395/375 |
| 5,235,694 | 8/1993 | Umeda .................................... | 395/494 |
| 5,274,788 | 12/1993 | Koike ...................................... | 395/484 |
| 5,291,580 | 3/1994 | Bowden, III et al. .................. | 395/405 |
| 5,367,645 | 11/1994 | Lubeck et al. .......................... | 395/309 |
| 5,418,924 | 5/1995 | Dresser ................................... | 395/494 |
| 5,448,744 | 9/1995 | Eifert et al. ............................. | 395/800 |
| 5,463,756 | 10/1995 | Saito et al. .............................. | 395/494 |
| 5,469,544 | 11/1995 | Aatresh et al. .......................... | 395/290 |
| 5,502,835 | 3/1996 | Le et al. .................................. | 395/496 |
| 5,511,182 | 4/1996 | Le et al. .................................. | 395/550 |

FOREIGN PATENT DOCUMENTS

| | | |
|---|---|---|
| 0 283 115 A2 | 9/1988 | European Pat. Off. . |
| 0 440 456 A3 | 8/1991 | European Pat. Off. . |

OTHER PUBLICATIONS

Intel. Microsystem Components Handbook,.

"MC68332 User's Manual", (System Integration Module), Motorola, Inc., 1990, pp. 4–27 through 4–46.

IBM Technical Disclosure Bulletin, "Anticipatory Generation of Addresses for Microprocessors," vol. 35, No. 7, Dec. 1992, pp. 394–397.

*Primary Examiner*—Eddie P. Chan
*Assistant Examiner*—Hong Kim
*Attorney, Agent, or Firm*—Paul J. Polansky

[57] ABSTRACT

Accordingly, the present invention provides a method for synchronously accessing memory in order to improve the performance in systems which use memories with slower cores. A first address for a first memory access is provided during a first clock period. A first control signal to indicate an address phase of the first memory access is activated during the first clock period. A second control signal to indicate a data phase of the first memory access is activated during a second clock period subsequent to the first clock period. A first data element accessed by the first address is received during a third clock period immediately subsequent to the second clock period. A second address for a second memory access is provided during the third clock period. The first control signal indicating an address phase of the second memory access is activated during the third clock period.

17 Claims, 15 Drawing Sheets

METHOD FOR ACCESSING MEMORY USING OVERLAPPING ACCESSES AND EARLY SYNCHRONOUS DATA TRANSFER CONTROL

This application is a continuation of prior patent application Ser. No. 08/353,764, filed Dec. 12, 1994 abandoned, which is a division of prior patent application Ser. No. 08/298,892, filed Aug. 31, 1994, now U.S. Pat. Ser. No. 8,727,005.

CROSS REFERENCE TO RELATED, COPENDING APPLICATIONS

Related subject matter is contained in the following copending patent applications:

1. Ser. No. 07/432,423, entitled "Integrated Circuit Microprocessor with Programmable Chip Select Logic" by James B. Eifert et al. and assigned to the assignee hereof, now U.S. Pat. No. 5,448,744, issued Sep. 5, 1995.
2. Ser. No. 08/298,885, entitled "Method for Synchronously Accessing Memory" invented by Chinh H. Le et al., filed Aug. 31, 1994 and assigned to the assignee hereof, now U.S. Pat. No. 5,502,835, issued Mar. 26, 1996.
3. Ser. No. 08/298,638, entitled "Programmable Pin Configuration Logic Circuit for Providing a Chip Select Signal and Related Method" invented by Chinh H. Le et al., filed Aug. 31, 1994 and assigned to the assignee hereof, now U.S. Pat. No. 5,511,182, issued Apr. 1, 1997, and
4. Ser. No. 08/298,868, entitled "Modular Chip Select Control Circuit and Method for Performing Pipelined Memory Accesses" invented by Chinh H. Le et al., filed Aug. 31, 1994 and assigned to the assignee hereof, now U.S. Pat. No. 5,617,559, issued Apr. 1, 1997.

1. Field of the Invention

This invention relates generally to data processors, and more particularly, to data processors with integrated interface logic.

2. Background of the Invention

Integrated circuit microprocessors must, in many cases, be connected with other integrated circuit devices in order to provide certain functions. Examples of such external devices include memories, serial interface adaptors, analog-to-digital converters and many others. In most cases, each such external device will require external control signals in order for the device to be appropriately activated when accessed by the microprocessor. For example, a static random access memory (SRAM) integrated circuit requires the chip enable, output enable, and write enable control signals to control read and write accesses. The timing requirements of these signals differ somewhat between commercially available devices. For example, some SRAMs provide output data asynchronously with respect to the output enable signal, whereas other SRAMs sample output enable and provide output data synchronously with a clock signal.

Typically, a designer of a system using a microprocessor and other integrated circuits will use "glue logic" to generate the required chip select signals from the address and bus control signals produced by the microprocessor itself. This extra logic adds significantly to the cost of the system being designed and may degrade performance, and therefore is highly undesirable.

The 80186 (also referred to as the iAPX 186), available from the Intel Corporation of Santa Clara, Calif., is an integrated circuit microprocessor which has internal logic for generating chip select signals. The chip select logic has limited ability to program the address range for which each of the seven possible chip selects is active and can programmably insert wait states into the bus cycles for which each chip select is active. In addition, some of the chip selects may be programmed to be active in only the memory or I/O address spaces of the microprocessor.

Another example of an integrated circuit microprocessor with on-board chip select logic is that disclosed by John A. Langan and James M. Sibigtroth in U.S. Pat. No. 5,151,986, issued Sep. 29, 1992. The disclosed chip select logic includes a control register by means of which the timing, polarity and number of wait states can be individually programmed for each of several chip select outputs.

A major problem associated with the integration of chip select logic onto a microprocessor integrated circuit involves the provision of sufficient flexibility to the user. The use of glue logic is extremely flexible, since the system designer has wide latitude in the placement of each external device with the microprocessor's memory map and the timing and other characteristics of the chip select signals themselves. This flexibility is very useful, since the variety of possible system designs and chip select requirements for particular peripheral devices is great. Providing sufficient flexibility in an integrated chip select unit while constraining the size of the unit within reasonable limits is quite difficult.

One type of flexibility is the ability to support CPUs with burst mode capability. Burst mode is a mode in which the CPU accesses a series of memory locations in consecutive clock cycles. For example, the CPU may read several words of data from memory as part of a move instruction by reading the words in consecutive clock cycles. Commercially available high-speed SRAMs support burst mode through a feature known as page mode, nibble mode, static column, or the like. However, these SRAMs require cores with short access time in order to provide the data within one clock cycle, and thus are generally expensive.

SUMMARY OF THE INVENTION

These and other features and advantages will be more clearly understood from the following detailed description taken in conjunction with the accompanying drawings.

BRIEF DESCRIPTION OF THE DRAWINGS

FIG. 2 illustrates in block diagram form a portion of a memory map of the data processing system of FIG. 1.

FIG. 3 illustrates in block diagram form a multi-level protection circuit of the chip select circuit of FIG. 1.

FIG. 4 illustrates in block diagram form a programmable access type circuit of the chip select circuit of FIG. 1.

FIG. 5 illustrates a timing diagram of a first memory access type performed by the chip select circuit of FIG. 1.

FIG. 6 illustrates a timing diagram of a second memory access type performed by the chip select circuit of FIG. 1.

FIG. 7 illustrates a timing diagram of a third memory access type performed by the chip select circuit of FIG. 1.

FIG. 8 illustrates in block diagram form a modular chip select control circuit of the chip select circuit of FIG. 1.

FIG. 9 illustrates in partial block diagram and partial logic diagram form a pin configuration logic circuit of the chip select circuit of FIG. 1.

FIG. 10 illustrates in block diagram form the timing control stage of the modular chip select control circuit of FIG. 8.

DETAILED DESCRIPTION OF A PREFERRED EMBODIMENT

Figure 1:
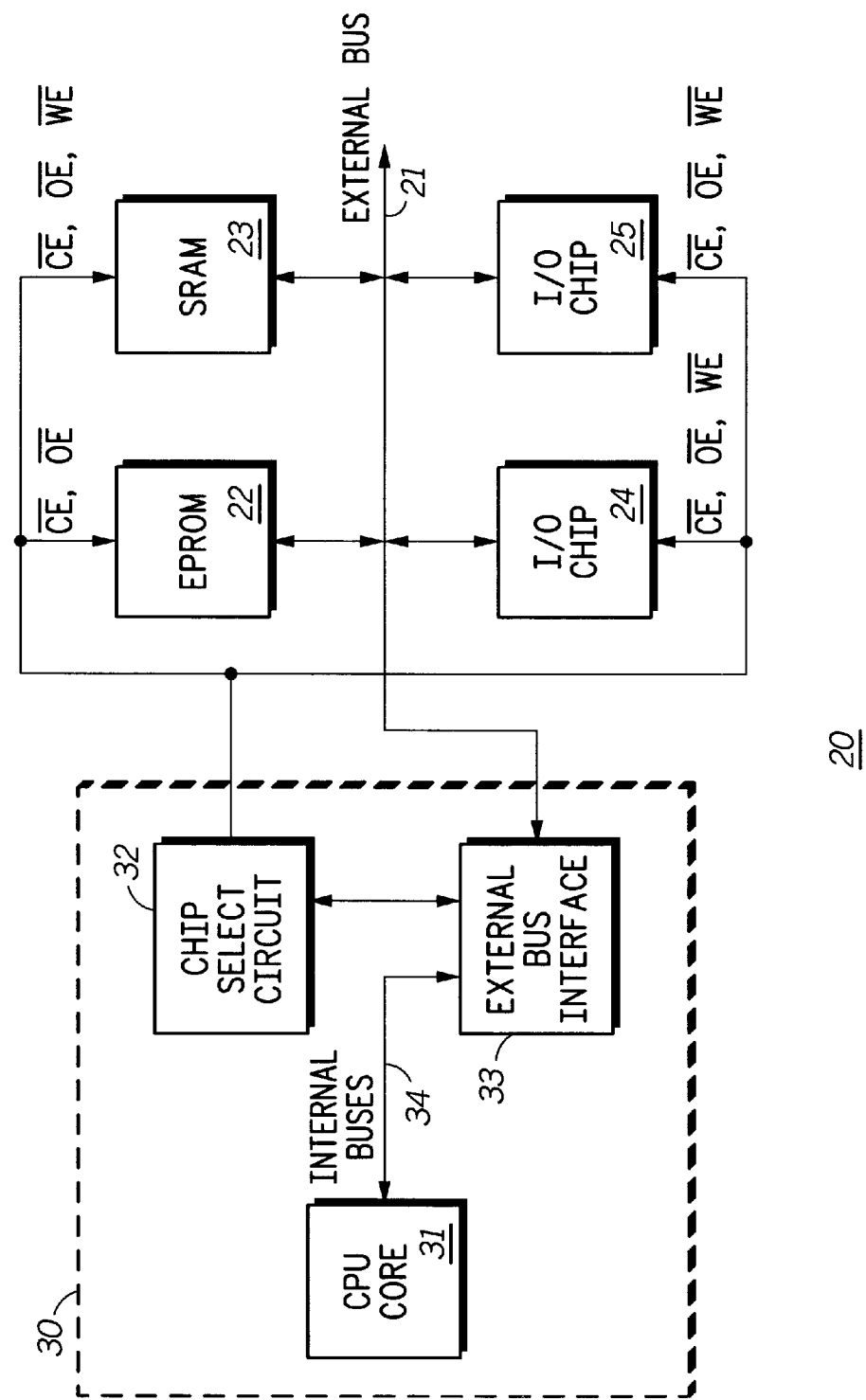
FIG. 1 illustrates in block diagram form a data processing system according to the present invention.

FIG. 1 illustrates in block diagram form a data processing system 20 according to the present invention. Data processing system 20 includes generally an external bus 21, an electrically programmable read only memory (EPROM) 22, a static random access memory (SRAM) 23, an input output (I/O) chip 24, an I/O chip 25, and a data processor 30. Data processor 30 is a single integrated circuit which functions as the central processing unit (CPU) of data processing system 20 and includes generally a CPU core 31, a chip select circuit 32, and an external bus interface 33, and internal buses 34.

CPU core 31 may be implemented using any known CPU architecture such as a complex instruction set computer (CISC), reduced instruction set computer (RISC), digital signal processor (DSP), or any other known architecture. Furthermore, data processor 30 can be considered either a highly integrated microprocessor, or a microcontroller (embedded controller, microcomputer, etc.). In the case of a microcontroller, data processor 30 would include other conventional elements of a data processing system, such as memory and peripherals, on chip and connected to internal buses 34. However, in data processing system 20, such devices are also included off chip and data processor 30 is connected to these devices by external bus 21 using external bus interface 33.

External bus interface 33 is connected to CPU core 31 via internal buses 34, and provides signals to external bus 21. External bus interface 33 serves to adapt internal buses 34 to a single external bus 21. For example, if CPU core 31 implemented a Harvard architecture with separate instruction and data paths, external bus interface 33 would sequence the accesses from these separate instruction and data paths onto external bus 21.

In order to reduce integrated circuit count, data processor 30 includes chip select circuit 32 to generate the timing and control signals to be provided directly to EPROM 22, SRAM 23 and I/O chips 24 and 25. For example, in the illustrated embodiment, chip select circuit 32 provides two active-low chip select signals known as chip enable ($\overline{CE}$) and output enable ($\overline{OE}$) to EPROM 22 for fetching instructions from external bus 21. For accessing a read-write device, chip select circuit 32 also provides a write enable ($\overline{WE}$) signal such as the write enable signal provided to SRAM 23 and I/O chips 24 and 25. Chip select circuit 32 has a bidirectional connection to external bus interface 33 for receiving address, attribute, and control signals associated with accesses to external bus 21. In addition to integrating board-level logic on chip, chip select circuit 32 provides an improved external interface, aspects of which are described generally in FIGS. 2–9.

Figure 2:
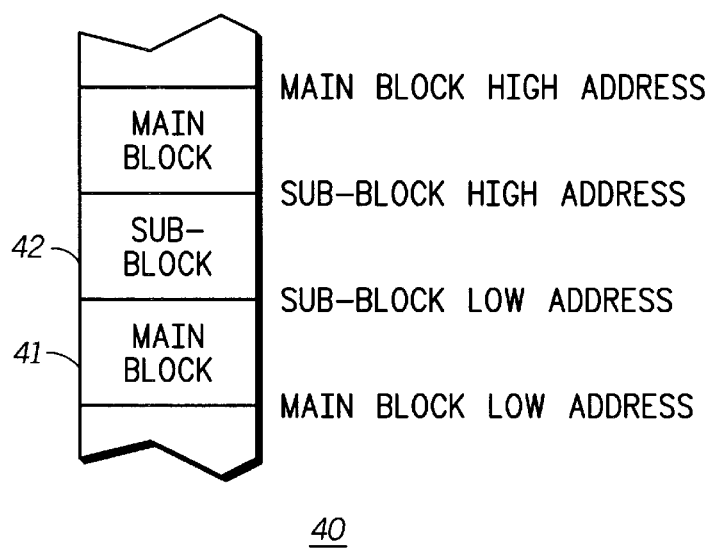
FIGS. 2–10 illustrate aspects of the chip select circuit of FIG. 1 useful in understanding the present invention.

FIG. 2 illustrates in block diagram form a portion 40 of a memory map of data processing system 20 of FIG. 1. Portion 40 represents generally a series of addresses in descending order with larger addresses represented above smaller addresses. Portion 40 includes a main block 41 which is bounded by a "MAIN BLOCK HIGH ADDRESS" and a "MAIN BLOCK LOW ADDRESS". Chip select circuit 32 of FIG. 1 includes the capability of programming a sub-block 42 to either overlap or to lie completely within the bounds of main block 41. This overlapping control is useful because as memory densities have increased, it is useful to have more than one region, each with different programmable attributes, associated with a single memory integrated circuit. To this end, sub-block 42 may be located completely within main block 41 and is bounded by a "SUB-BLOCK HIGH ADDRESS and a "SUB-BLOCK LOW ADDRESS" as shown in FIG. 2.

Figure 3:
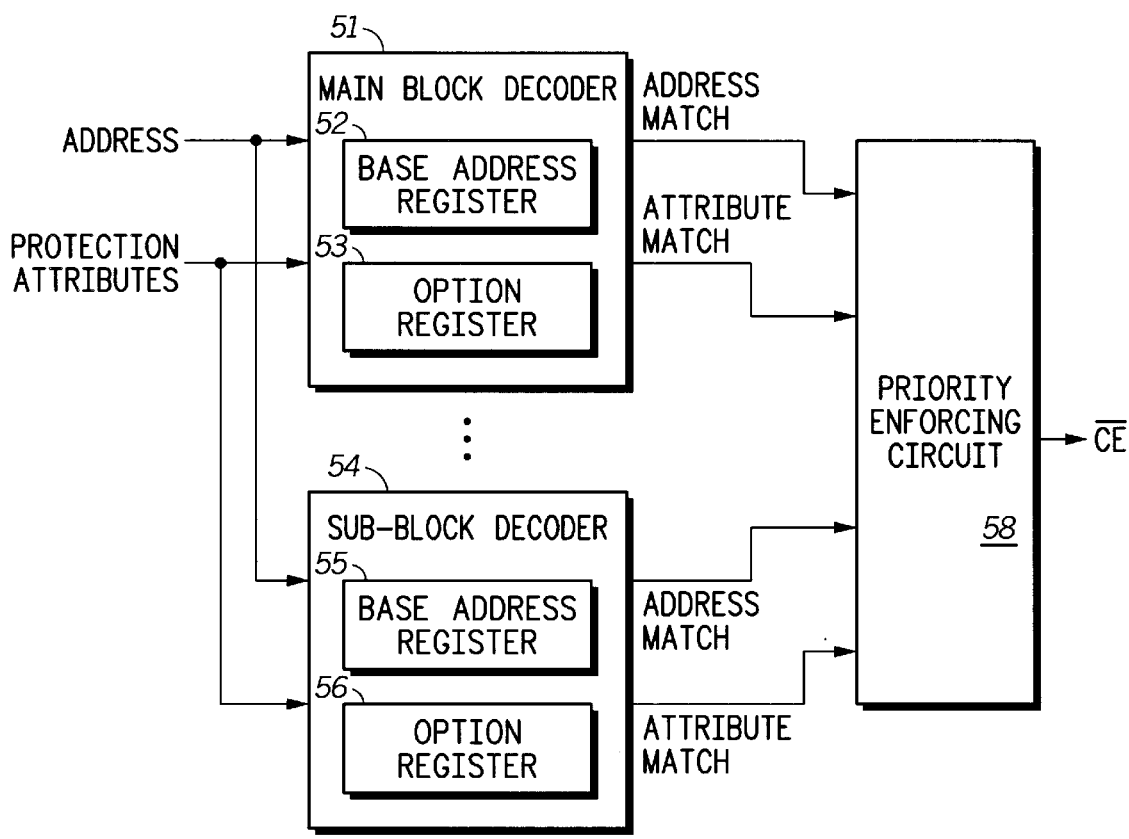

Chip select circuit 32 implements this overlapping memory map as illustrated in FIG. 3, which illustrates in block diagram form a multi-level protection circuit 50 of chip select circuit 32 of FIG. 1. Multi-level protection circuit 50 includes generally decoders for an arbitrary number of blocks, some of which may be overlapping. For example, as illustrated in FIG. 3, multi-level protection circuit 50 includes a main block decoder 51 and a sub-block decoder 54 to implement main block 41 and sub-block 42 of FIG. 2, respectively. Note that as used here the terms "block" and "region" are synonymous, and a "sub-block" represents a block or region within the bounds of a larger block or region.

Main block decoder 51 includes a base address register 52 corresponding to the MAIN BLOCK LOW ADDRESS, and an option register 53. Option register 53 includes a block size field which, when added to the base address stored in base address register 52, determines the MAIN BLOCK HIGH ADDRESS. In addition, option register 53 stores attributes for the protection of the region associated with main block 41. Likewise, sub-block decoder 54 includes a base address register 55 which determines the SUB-BLOCK LOW ADDRESS, and an option register 56 which includes a block size field which determines the SUB-BLOCK HIGH ADDRESS. In addition, option register 56 includes fields for programmable attributes associated with sub-block 42.

Both main block decoder 51 and sub-block decoder 54 receive an input address labelled "ADDRESS" during a bus cycle of CPU core 31 of FIG. 1, and in addition, receive control signals which represent protection attributes, labelled "PROTECTION ATTRIBUTES", of the cycle in progress. An example of such a protection attribute would be a write signal indication. If main block 41 or sub-block 42 were write protected, for example, the write signal would indicate that the pending cycle is a write cycle and that therefore the present cycle does not match the programmed protection. Each of main block decoder 51 and sub-block decoder 54 compare the ADDRESS to the region defined by the base address register and the region size field in the corresponding option register. If the ADDRESS is within the region, the corresponding block decoder activates an address match signal, labelled "ADDRESS MATCH". In addition, if the input protection attributes match the programmed values in the corresponding option register, the block decoder activates a corresponding attribute match signal, labelled "ATTRIBUTE MATCH".

A priority enforcing circuit 58 then receives the ADDRESS MATCH and ATTRIBUTE MATCH signals from each block and determines based on a priority mechanism whether to activate an external control signal, such as a signal labelled "$\overline{CE}$". If only one of main block decoder 51 and sub-block decoder 54 activates its ADDRESS MATCH signal, then priority enforcing circuit 58 activates signal $\overline{CE}$ only if the corresponding ATTRIBUTE MATCH signal is also active. Referring now to FIGS. 2 and 3 together, assume the ADDRESS is between the MAIN BLOCK LOW ADDRESS and the SUB-BLOCK LOW ADDRESS. In this case, main block decoder 51 will detect an address match and activate signal ADDRESS MATCH. In addition, assume that the PROTECTION ATTRIBUTES match the protection attributes programmed in option register 53. In this case, main block decoder 51 will also activate signal ATTRIBUTE MATCH. However, since the ADDRESS is not within sub-block 42, sub-block decoder 54 will not activate its address match signal. Therefore priority enforcing circuit 58 will activate signal $\overline{CE}$ based on an address and attribute match within main block 41.

Now take the case of the ADDRESS falling within sub-block 42. In this case, both main block decoder 51 and sub-block decoder 54 activate their corresponding ADDRESS MATCH signals. Now also assume that the PROTECTION ATTRIBUTES match those defined in option register 53 so that main block decoder 51 activates its ATTRIBUTE MATCH signal. However, at the same time, the PROTECTION ATTRIBUTES do not match the attributes programmed in option register 56 so that sub-block decoder 54 does not activate its ATTRIBUTE MATCH signal. In this case, priority enforcing circuit 58 will keep signal $\overline{CE}$ inactive, recognizing the priority of sub-block decoder 54 over main block decoder 51. Thus, sub-block 42 may be nested within main block 41 at a higher protection priority. This nesting of blocks and prioritization between blocks may be expanded to an arbitrary number of nestings.

Figure 4:
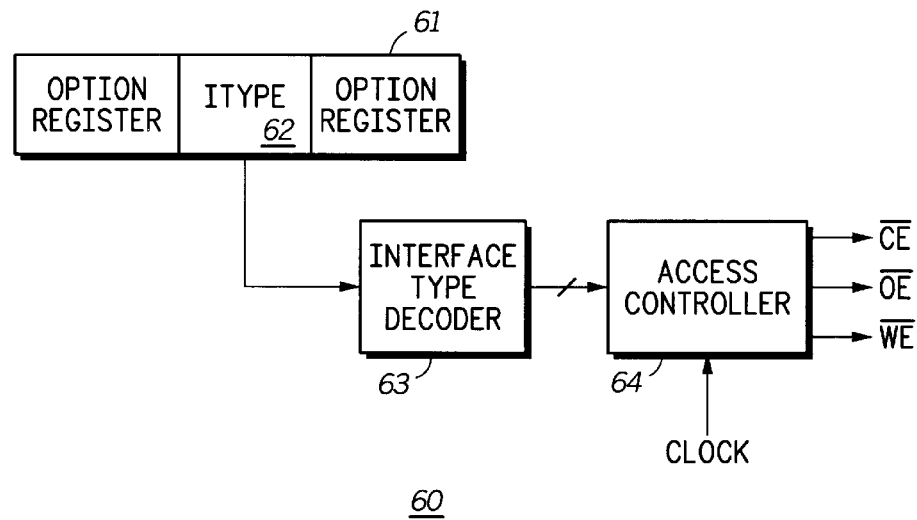

FIG. 4 illustrates in block diagram form a programmable access type circuit 60 of chip select circuit 32 of FIG. 1. Programmable access type circuit 60 includes generally an option register 61 having an interface type field 62, an interface type decoder 63, and an access controller 64. Option register 61 is a register associated with a programmable region such as previously illustrated in FIG. 3, which includes an interface type (ITYPE) field 62. ITYPE field 62 includes an encoded interface type value, which is provided to an input of interface type decoder 63. Interface type decoder 63 then decodes ITYPE field 62 and provides the decoded signals to access controller 64. Access controller 64 then generates timing information for the $\overline{CE}$, $\overline{OE}$, and $\overline{WE}$ signals based on an input clock signal labelled "CLOCK".

In known chip select circuits, option registers define timing and interface characteristics for individual signals in predecoded fields. Thus, in the presence of software errors corrupting one or more of these bits, illegal timing combinations will be generated resulting in hardware errors or program corruption. However, programmable access type circuit 60 prevents such error-causing combinations and thus data processor 30 is more immune to software errors and allows quicker and more error-free software development. Programmable access type circuit 60 prevents these software errors from causing undefined memory accesses by using an encoded ITYPE field. During software development, ITYPE field 62 may be improperly encoded as a result of a software error such that one or more bits of ITYPE field 62 have an incorrect value. Interface type decoder 63, by decoding an encoded signal from ITYPE field 62, provides a decoded signal which may assume either a legal state or reserved state. If ITYPE field 62 encodes legal state, then interface type decoder 63 provides an output to access controller 64 to provide timing information based on the legal interface type selected. However, if ITYPE field 62 encodes a reserved state, then interface type decoder 63 will not activate its output to access controller 64. Thus access controller 64 will not perform an external bus cycle.

Figure 5:
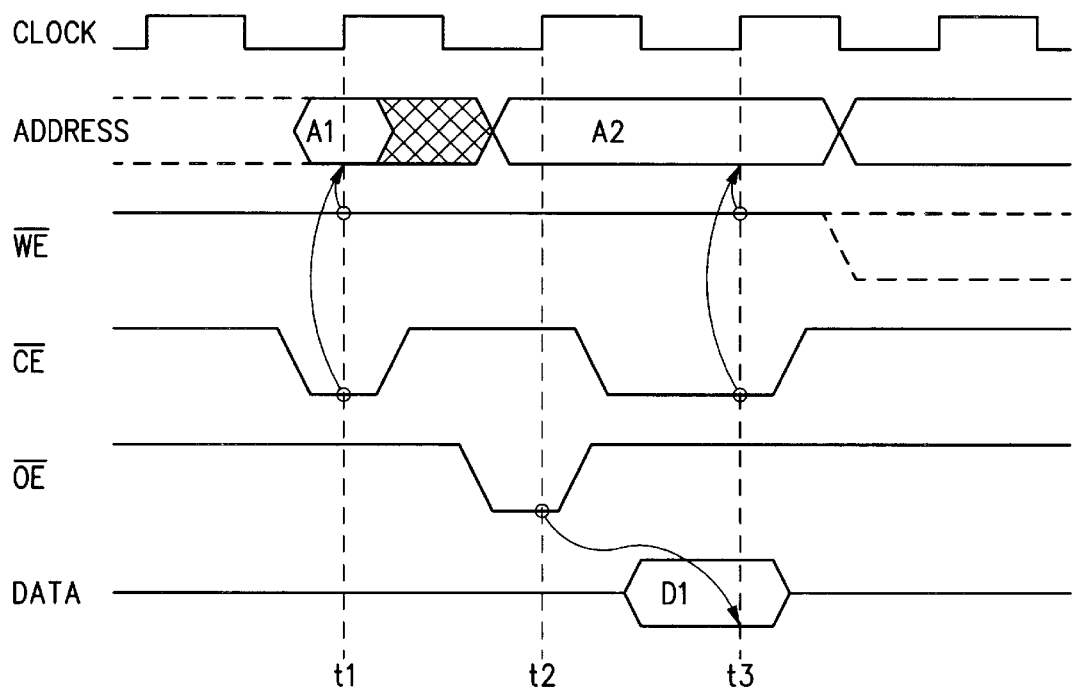

FIG. 5 illustrates a timing diagram of a first memory access type performed by chip select circuit 32 of FIG. 1. Shown in FIG. 5 are several signals pertinent to understanding this first memory access type, including CLOCK, ADDRESS, $\overline{WE}$, $\overline{CE}$, $\overline{OE}$, and DATA. This memory access type is known as the "synchronous interface with early synchronous output enable" type. Shown on the first line in FIG. 5 is signal CLOCK, to which all other signals shown in FIG. 5 are synchronous to. Three time points, designated "t1", "t2", and "t3" and corresponding to successive low-to-high transitions of signal CLOCK, are relevant to understanding this memory access type.

Note that FIG. 5 assumes that prior to time t1, all previous accesses have been terminated. Also note that the signal waveforms illustrated in FIG. 5 assume that chip select circuit 32 provides signals to external bus interface 33 to acknowledge the address and data phases of the access cycle. If, however, external acknowledge signals are used, the duration of the address and data phases of the accesses will depend on when these acknowledge signals are received. For example, a signal known as address acknowledge, designated "$\overline{AACK}$", acknowledges the address phase of an access cycle. Chip select circuit 32 keeps signal $\overline{CE}$ active until it senses the activation of signal $\overline{AACK}$ prior to a low-to-high transition of the CLOCK. A signal known as transfer acknowledge, designated "$\overline{TA}$", acknowledges the termination of the data phase of an access cycle. Chip select circuit 32 keeps signal $\overline{OE}$ (during read cycles) or $\overline{WE}$ (during write cycles) active until it recognizes the activation of signal $\overline{TA}$ on a low-to-high transition of the CLOCK.

An address corresponding to a first memory access, labeled "A1", is set up to the low-to-high transition of signal CLOCK at time point t1. In order to signify that this access is a read access, chip select circuit 32 makes signal $\overline{WE}$ inactive. In addition, chip select circuit 32 activates signal $\overline{CE}$ to cause the accessed memory device to latch address A1 and begin the access cycle, a setup time prior to t1. Subsequently, prior to the low-to-high transition of signal CLOCK at time point t2, chip select circuit 32 activates signal $\overline{OE}$, a setup time prior to t2. The activation of signal $\overline{OE}$ causes the memory device to begin to output its data. By being set up to the low-to-high transition of signal CLOCK, signal $\overline{OE}$ is thus synchronous and a memory device responding to this type of access cycle would recognize signal $\overline{OE}$ at low-to-high transitions of signal CLOCK. After the memory device recognizes the activation of signal $\overline{OE}$, it begins to provide its output data to complete the read access cycle. As illustrated in FIG. 5, the memory device responding to this access type as programmed in chip select circuit 32 has one wait state. Thus, chip select circuit 32 activates signal $\overline{OE}$ a setup time prior to t2, causing the memory device provides the accessed data element, labeled "D1", a setup time prior to the low-to-high transition of signal CLOCK at time point t3.

The advantage of this access cycle type lies in the fact that memory devices with relatively slow memory cores may be accessed sequentially and efficiently. Since signal $\overline{OE}$ is setup to t2 and recognized by the accessed memory device at t2, chip select circuit 32 may perform an address phase of a second access early, before the completion of the data phase of the first access. Chip select circuit 32 provides a second, overlapping address labelled "A2" at least a setup time prior to t3, again keeping signal $\overline{WE}$ inactive and again activating signal $\overline{CE}$ a setup time prior to t3.

Figure 6:
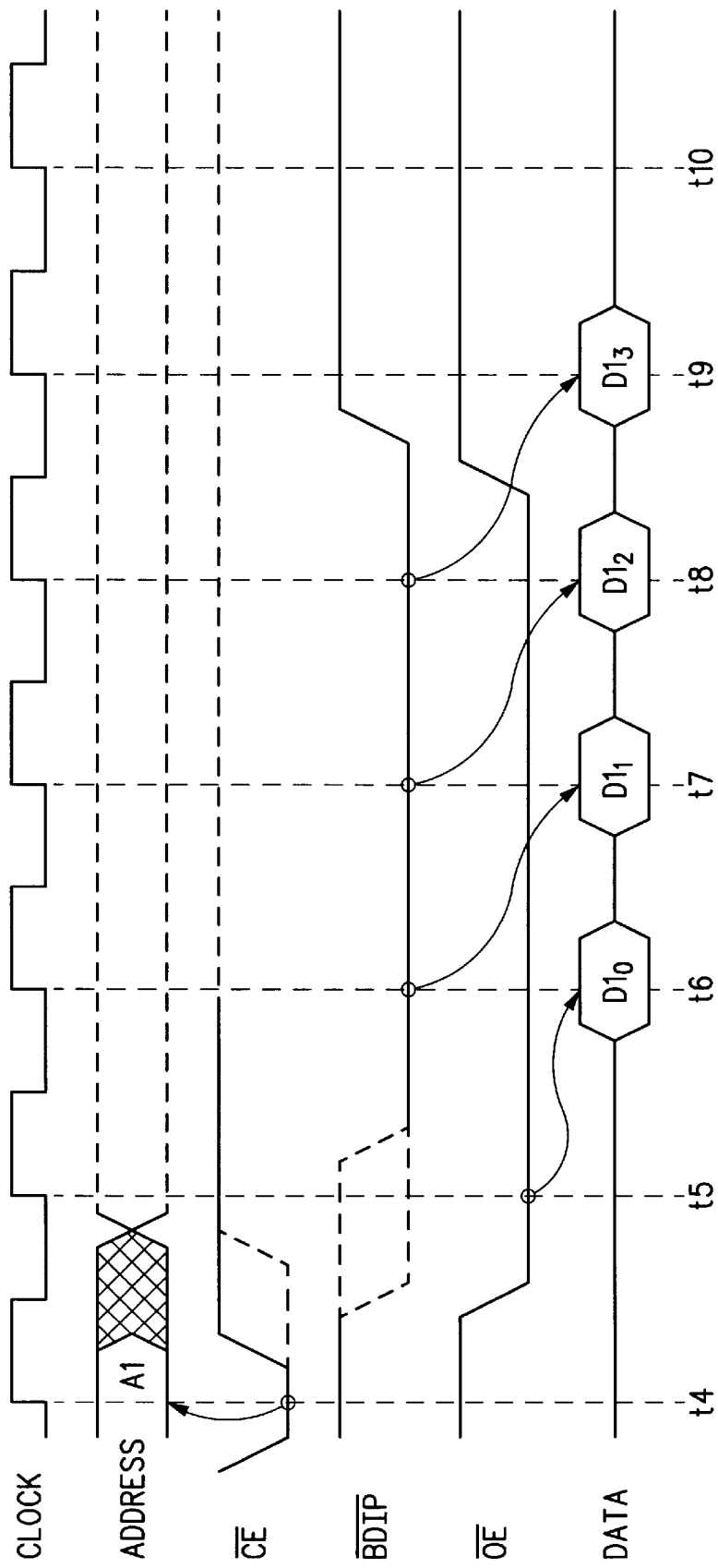

Another interface type is illustrated in FIG. 6, which illustrates a timing diagram of a second memory access type performed by chip select circuit 32 of FIG. 1. As in FIG. 5, signals pertinent to bus cycles are shown, including CLOCK, ADDRESS, $\overline{CE}$, $\overline{OE}$, and DATA. In addition, FIG. 6 illustrates a signal labelled "BDIP", which indicates that a burst data cycle is in progress. FIG. 6 illustrates a memory access type known as the "synchronous burst read with synchronous $\overline{OE}$" type. Additional low-to-high transitions of signal CLOCK designated "t4", "t5", "t6", "t7", "t8", "t9", and "t10" are shown in FIG. 6.

This type of access is similar to the access illustrated in FIG. 5, but unlike the access illustrated in FIG. 5, the accessed memory device performs a burst access by providing four sequential data elements at time points t6, t7, t8, and t9. These four data elements are labelled "$D1_0$", "$D1_1$", "$D1_2$", and "$D1_3$", respectively. The memory device responding to this access type as programmed in chip select circuit 32 has one wait state. Thus, after recognizing the activation of signal $\overline{OE}$ at time t5, the memory device provides accessed data element $D1_0$, a setup time prior to the low-to-high transition of signal CLOCK at time point t6. Subsequent data elements as part of the burst are provided on subsequent low-to-high transitions of signal CLOCK in response to an activation of signal $\overline{BDIP}$. The advantage of this access cycle type lies in the fact that memory devices with relatively slow memory cores may be accessed sequentially and efficiently.

Figure 7:
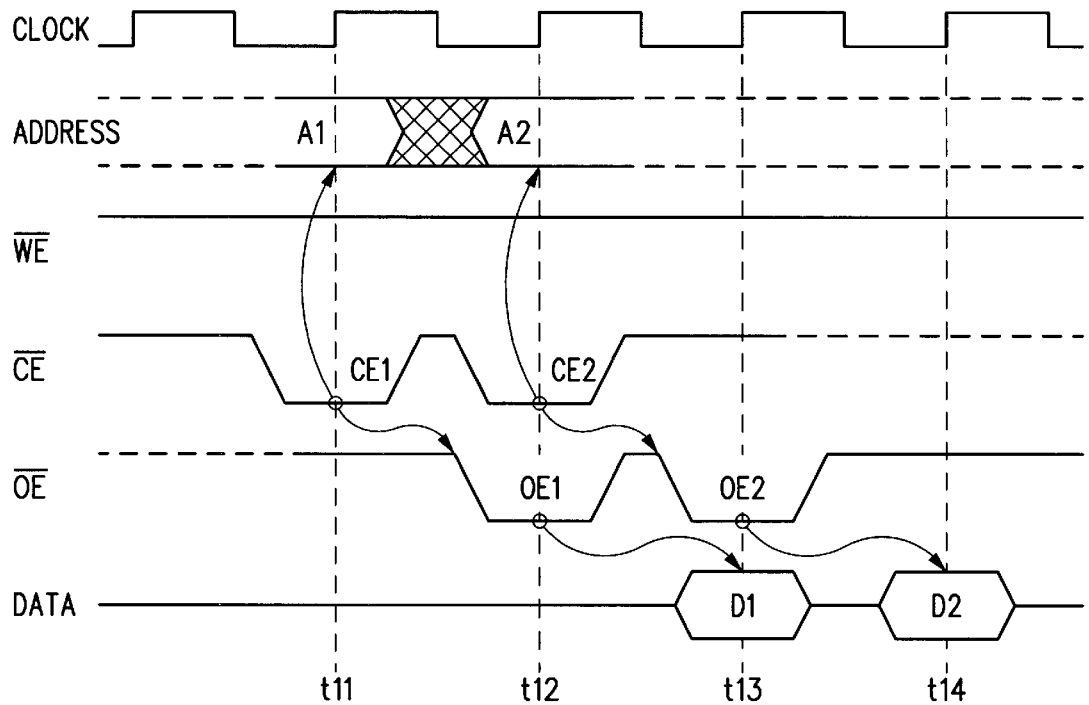

Yet another interface type is illustrated in FIG. 7, which illustrates a timing diagram of a second memory access type performed by chip select circuit 32 of FIG. 1. As in FIG. 5, signals pertinent to bus cycles are shown, including CLOCK, ADDRESS, $\overline{WE}$, $\overline{CE}$, $\overline{OE}$, and DATA. FIG. 7 illustrates a memory access type known as the "synchronous interface with synchronous $\overline{OE}$ and early overlap" type. Additional low-to-high transitions of signal CLOCK designated "t11", "t12", "t13", and "t14" are shown in FIG. 7.

Near t11, an address of a first bus cycle, also labeled A1, is set up to the low-to-high transition of signal CLOCK occurring at t11. In addition, signal $\overline{WE}$ is inactive and $\overline{CE}$ is active (designated "CE1") to indicate a read cycle at the time address A1 is valid. Subsequently, a data phase corresponding to this first access occurs by chip select circuit 32 activating signal $\overline{OE}$ (designated "OE1") a setup time prior to t12. Subsequently, as previously indicated in FIG. 5, the accessed memory device provides data element D1 a setup time prior to t13.

However, according to this interface type, chip select circuit 32 begins a second access by performing an address phase during at least a portion of the data phase of the first access. Chip select circuit 32 performs this interface by providing a second address labeled A2, a setup time prior to the low-to-high transition of signal CLOCK at time point t12. As before, chip select circuit 32 keeps signal $\overline{WE}$ inactive to indicate a read cycle and activates signal $\overline{CE}$ (designated "$\overline{CE2}$") to indicate to the accessed memory device that address A2 is valid. After the data phase of the first access is completed by the accessed memory device providing data element D1, a setup time prior to t13, a data phase of the second access may take place by chip select circuit 32 activating signal $\overline{OE}$ (designated "OE2"), a setup time prior to t13. Subsequently, the accessed memory device provides a data element labelled "D2" a setup time prior to t14. By beginning the address phase of the second access, prior to a termination of the data phase of the first access, chip select circuit 32 allows overlapping accesses which improves bus utilization and allows more memory accesses to take place in a given amount of time.

Figure 8:
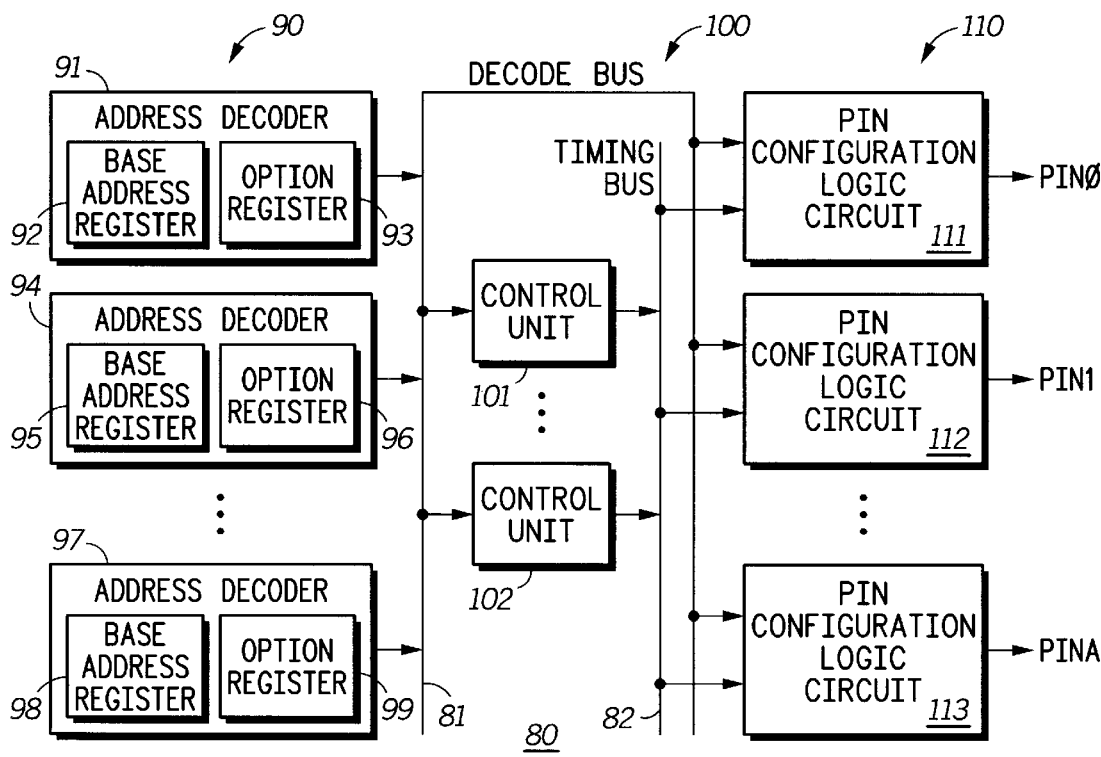

Chip select circuit 32 is also modular to allow reconfiguration for different applications as illustrated in FIG. 8, which illustrates in block diagram form a modular chip select control circuit 80 of chip select circuit 32 of FIG. 1. Modular chip select control circuit 80 includes generally two buses for the interconnection of signals including a first bus labeled "DECODE BUS" 81 and a second bus labeled "TIMING BUS" 82. Modular chip select control circuit 80 also includes an address decode stage 90, a timing control stage 100, and a pin configuration stage 110. Modular chip select control circuit 80 is modular and reconfigurable by including a first arbitrary number of address decoders and address decode stage 90, a second arbitrary number of control units in timing control stage 100, and a third arbitrary number of pin configuration logic circuit and pin configuration stage 110.

As illustrated in FIG. 8, address decode stage includes representative address decoders 91, 94, and 97. Address decoder 91 includes a base address register 92 and an option register 93. Base address register 92 defines a base address for a programmable region associated with address decoder 91. Option register 93 includes a size of the region associated with address decoder 91 and other programmable fields related to the attributes of this region. Address decoder 91 receives an address from CPU core 31 of FIG. 1 by internal buses 34 and performs a comparison to see if this address is within the region defined by base address register 92 in the size field of option register 93. In response to an address match, address decoder 91 provides control signals to DECODE BUS 81. Likewise, address decoders 94 and 97 also detect if the address is within their corresponding programmable regions and provide control signals to DECODE BUS 81 accordingly. The number of address decoders in address decode stage 90 is arbitrary to accommodate different system needs, and there is a tradeoff between flexibility and chip size. For example, in some applications it is helpful to increase the number of programmable regions available to accommodate a more flexible software or system architecture. In other applications, the number of address decoders may be decreased to minimize integrated circuit cost.

Timing control stage 100 includes a second arbitrary number of control units. In timing control stage 100, two control units, 101 and 102, are illustrated. Timing control stage 100 functions as an access state machine to provide chip select signals to external bus 21, and each of control units 101 and 102 has an input connected to DECODE BUS 81 for receiving decoded signals to indicate whether a bus cycle in progress matches the attributes of one or more programmable regions. In response, a selected one of the control units in timing control stage 100 provides sequential timing information to TIMING BUS 82 to reflect the appropriate timing for the given programmed interface type. The number of control units selected for timing control stage 100 determines the number of pending overlapping memory accesses in progress. This number of pending memory accesses is also known as the pipeline depth.

For example, address decoder 91 in address decode stage 90 recognizes an access to its corresponding programmable region and provides control signals to DECODE BUS 81 in response. In timing control stage 100, a control unit such as control unit 101 becomes associated with this bus cycle and provides timing signals to TIMING BUS 82 for this access during the pendency of this access. A second access may take place during the first access and an address decoder in address decode stage 90 may recognize an access to its corresponding programmable region and having attributes matching those programmed in its option register and provide control signals to DECODE BUS 81. A second control unit such as control unit 102 may then begin providing timing signals to TIMING BUS 82 to overlap one or more chip select control signals for this access as determined by the interface type.

Pin configuration stage 110 includes a third arbitrary number of pin configuration logic circuits. Each pin configuration logic circuit corresponds and is dedicated to an integrated circuit pin. The integrated circuit pin, however, may be shared between this chip select signal and another signal, and have its function programmably set.

This third arbitrary number may vary between applications in order to allow better tradeoffs between flexibility and system costs. For example, in some applications where cost is not the most important factor, a greater number of pin configuration logic circuits may be included to provide more flexibility and the ability to provide chip select signals for a greater number of memory devices. In other applications in which cost is a greater consideration, a fewer number of pin configuration logic circuits may be used.

In pin configuration stage 110, representative pin configuration logic circuits 111, 112, and 113 are shown providing output signals labeled "PIN0", "PIN1", and "PIN2", respectively. Each pin configuration logic circuit has one input connected to DECODE BUS 81 for receiving control signals and a second input connected to TIMING BUS 82 for receiving timing information. Because each pin configuration logic circuit receives all possible timing information, each pin configuration logic circuit may be configured to be any of a group of chip select functions. For example, pin configuration logic circuit 111 may be configured to be any one of the $\overline{CE}$, $\overline{WE}$, or $\overline{OE}$ signals, depending upon how pin configuration logic circuit 111 is programmed. Thus, by including a first arbitrary number of address decoders in address decode stage 90, a second arbitrary number of control units and timing control stage 100, and a third arbitrary number of pin configuration logic circuits in pin configuration stage 110, modular chip select control circuit 80 provides maximum flexibility by defining arbitrary number of memory regions, arbitrary access pipeline depth, and an arbitrary number of chip select signals. These arbitrary numbers may be varied between embodiments to maximize the available tradeoffs.

Figure 9:
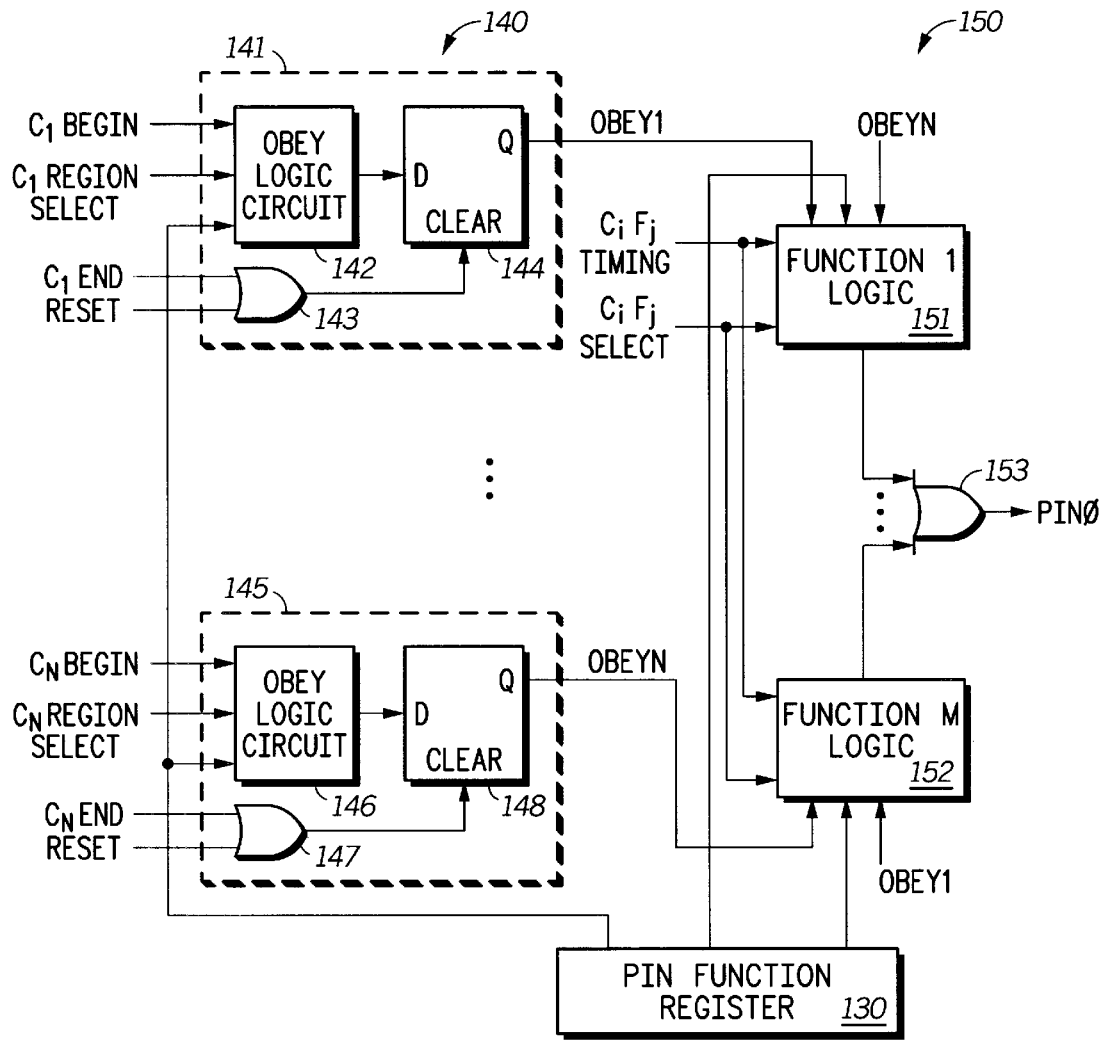

FIG. 9 illustrates in partial block diagram and partial logic diagram form a pin configuration logic circuit 120 of chip select circuit 32 of FIG. 1. Pin configuration logic circuit 120 includes generally a pin function register 130, an obey logic portion 140, and a pin function output portion 150. Pin function register 130 stores bits for defining a selective pin function such as one of $\overline{CE}$, $\overline{OE}$, and $\overline{WE}$, and provides a decoded output signal representative of the selected function. Obey logic portion 140 includes an arbitrary number of obey circuits such as illustrative obey circuits 141 and 145. Obey circuit 141 includes generally an obey logic circuit 142, an OR gate 143, and a D-type flip-flop 144. Obey circuit 141 is associated with a first cycle, which is labeled "$C_1$". Obey circuit 141 has a first input for receiving a signal labeled "$C_1$ BEGIN", a second input for receiving a signal labeled "$C_1$ REGION SELECT", a third input connected to pin function register 130, and an output. OR gate 143 has a first input for receiving a signal labeled "$C_1$ END", a second input for receiving a signal label "RESET", and an output. D-type flip-flop 144 has a data input labeled "D" connected to the output of obey logic circuit 142, a clear input labeled "CLEAR" connected to the output of OR gate 143, and an output terminal labeled "Q" for providing an output signal labeled "OBEY1".

Similarly, obey circuit 145 is associated with an Nth cycle which is labelled "$C_N$" and includes generally an obey logic circuit 146 and OR gate 147 and a D-type flip-flop 148. Obey logic circuit 146 has a first input for receiving a signal labeled "$C_N$ BEGIN", a second input for receiving a signal labeled "$C_N$ REGION SELECT", a third input connected to the output of pin function register 130, and an output. OR gate 147 has a first input for receiving a signal labeled "$C_N$ END", a second input for receiving signal RESET, and an output. D-type flip-flop 148 has a D input connected to the output of obey logic circuit 146, a CLEAR input connected to the output of OR gate 147, and a Q output for providing a signal labeled "OBEYN".

Obey circuits 141 and 145 determine which cycle the pin associated with pin configuration logic circuit 120 should obey. During a first cycle, a control unit in timing control stage 100 of FIG. 8 activates a corresponding cycle begin signal. For example, assume control unit 101 activates signal $C_1$ BEGIN. In addition, assume that an address decoder and address decode stage 90 activates $C_1$ REGION SELECT. If the output of pin function register 130 matches $C_1$ REGION SELECT, then obey logic circuit 142 activates it output in response to the activation of signal $C_1$ BEGIN. This signal is then provided as an input as the D-input to D-type flip-flop 144, which then activates signal OBEY1 at the Q output thereof on the next occurrence of the CLOCK signal (not shown in FIG. 9). Signal OBEY1 then remains active until, the selected control unit activates signal $C_1$ END which in turn clears D-type flip-flop 144, or when the activation of signal RESET resets pin configuration logic circuit 120. Each of the obey circuits in obey logic portion 140 responds similarly to the activation of the corresponding cycle begin and end signals and the corresponding region select signal.

Pin function output portion 150 includes generally an arbitrary number of function logic blocks corresponding to each possible pin function. Illustrated in FIG. 9 is a first function logic block 151 labeled "FUNCTION 1 LOGIC" and a second function logic block 152 labeled "FUNCTION M LOGIC". Each function logic block has inputs for receiving each obey signal such as signals OBEY1 and OBEYN, inputs for receiving timing signals labeled "$C_iF_j$ TIMING" (which represent timing signals for each cycle and each function) and select signals labeled $C_iF_j$ SELECT corresponding thereto, and another input connected to a corresponding output of pin function register 130. In this case, the subscript i goes from 1 to N, and j from 1 to M, where N and M are arbitrary numbers. For example, FUNCTION 1 LOGIC block 151 receives an output of pin function register 130, which indicates that PIN0 has a function of $F_1$. Likewise, FUNCTION M LOGIC block 152 receives an input from pin function register 130, which indicates that the function of PIN0 is function $F_M$. Each function logic circuit is responsive to timing signals associated with an active cycle if the output of pin function register 130 indicates that the pin responds to the corresponding function. For example, if pin function register 130 selects PIN0 to have function $F_1$, then FUNCTION 1 LOGIC block 151 is active. During a first cycle signal OBEY1 is active and FUNCTION 1 LOGIC block 151 then provides its output corresponding to an appropriate timing signal. This appropriate timing signal would be $C_iF_j$ TIMING. In this case, all other function logic blocks keep their outputs inactive in a logic low state such that the output of OR gate 153 providing signal PIN0 only responsive to the active function logic block using the appropriate timing signal. Thus, the chip select signal provided to PIN0 only obeys the active timing cycle, allowing arbitrary pipelined depth. Other timing signals associated with a cycle which is not active but is pending in the pipeline is not obeyed by PIN0 until the active cycle terminates.

Figure 10:
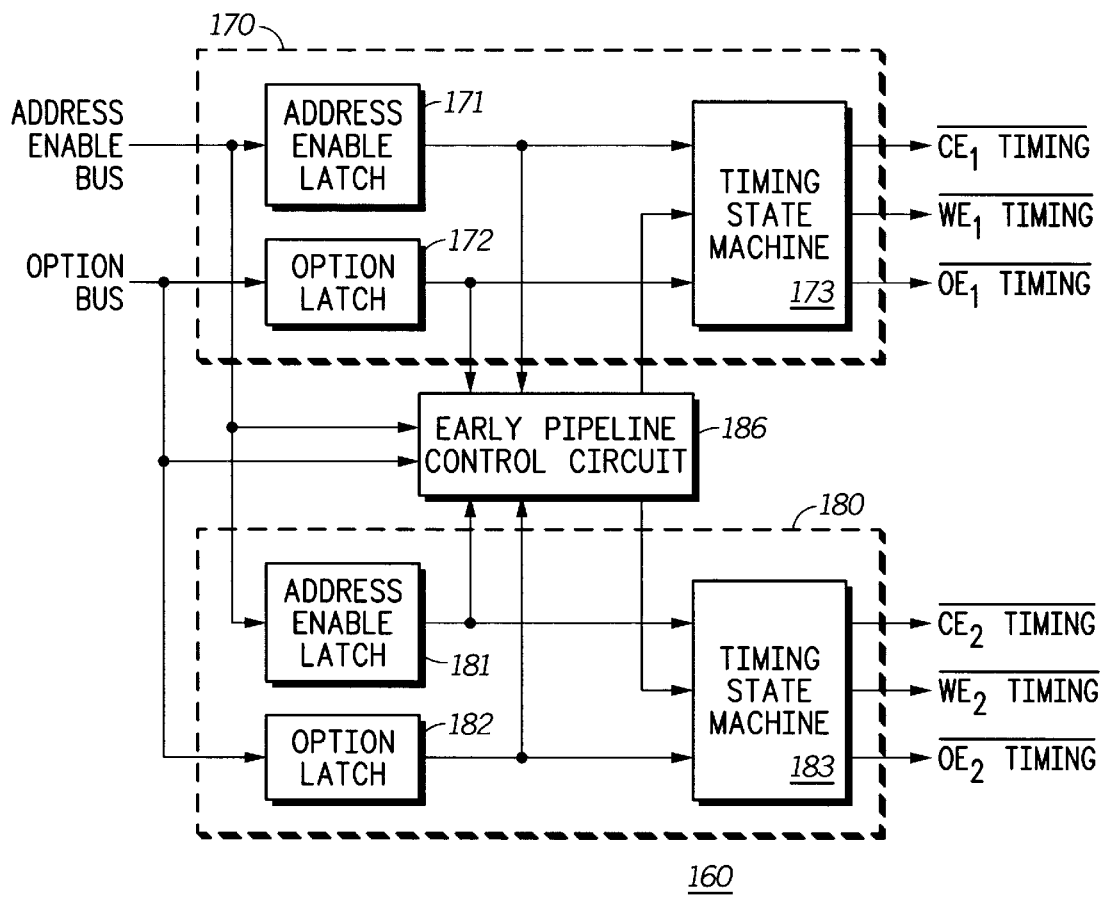

FIG. 10 illustrates in block diagram form a portion 160 of timing control stage 100 of modular chip select control circuit 80 of FIG. 8. Portion 160 includes generally a first control unit 170, a second control unit 180, and an early pipeline control circuit 186. Control unit 170 includes generally an address enable latch 171, an option latch 172, and a timing state machine 173. Address enable latch 171 has an input connected to an address enable portion of internal buses 34, labelled "ADDRESS ENABLE BUS". CPU core 31 provides an address enable signal conducted on the ADDRESS ENABLE BUS to indicate that an address phase of an access is in progress. In response, portion 160 must translate the address enable signal into an appropriate chip select signal to drive memory devices directly. Address enable latch 171 has an output provided to an input of timing state machine 173 and to an input of early pipeline control circuit 186. Option latch 172 has an input connected to an option bus portion of internal buses 34, labelled "OPTION BUS", and an output provided to an input of timing state machine 173 and to an input of early pipeline control circuit 186. Timing state machine 173 has inputs connected to the outputs of address enable latch 171, option latch 172, and a first output of early pipeline control circuit 186, and outputs for providing three timing signals, labelled "$\overline{CE_1}$ TIMING", "$\overline{WE_1}$ TIMING", and "$\overline{OE_1}$ TIMING".

Likewise, control unit 180 includes an address enable latch 181, an option latch 182, and a timing state machine 183. Control unit 180 includes generally an address enable latch 181, an option latch 182, and a timing state machine 183. Address enable latch 181 has an input connected to the ADDRESS ENABLE BUS for receiving the address enable signal. Address enable latch 181 has an output provided to an input of timing state machine 183 and an input of early pipeline control circuit 186. Option latch 182 has an input connected to an option bus portion of internal buses 34, and an output provided to an input of timing state machine 183 and an input of early pipeline control circuit 186. Timing state machine 173 has inputs connected to the outputs of address enable latch 171, option latch 172, and a first output of early pipeline control circuit 186, and outputs for providing three timing signals, labelled "$\overline{CE_2}$ TIMING", "$\overline{WE_2}$ TIMING", and "$\overline{OE_2}$ TIMING".

Early pipeline circuit 186 has a first input connected to the address enable bus for receiving the address enable signal, a second input connected to the option bus, and inputs connected to the outputs of address enable latches 171 and 181 and option latches 172 and 182. Early pipeline control circuit 186 provides outputs to timing state machines 173 and 183 to determine which cycle is active when two cycles overlap, thus avoiding improper chip select signal timing.

Timing control stage 100 allows efficient pipelining of accesses by coordinating the timing of control units 170 and 180. There are two pipeline detection and control mechanisms. First, early pipeline control circuit 186 coordinates overlapping accesses, such as accesses having the types illustrated in FIG. 5 or FIG. 7, by providing additional control signals to the two timing state machines 173 and 183 to prevent illegal timing sequences. Specifically, early pipeline control circuit 186 detects whether overlapping accesses are to the same region or different regions, and whether overlapping access cycles are read or write cycles, and provides appropriate control signals in response. Second, control units 170 and 180 provide proper chip select signal timing by examining two of the accessed regions' characteristics. One characteristic is the interface type as determined by the ITYPE field from the OPTION BUS. The other characteristic is whether the cycle is to be terminated by an external acknowledge signal, or internally after a predefined number of wait states, which are indicated by corresponding fields from the OPTION BUS.

Description of a Particular Embodiment

The circuitry illustrated in FIGS. 2–10 is better understood with reference to a particular embodiment, as illustrated in FIGS. 11–19. As used herein, "activate" or "activation" refers to a signal assuming its logically true state. An "active high" signal is active or true at a logic high voltage. An "active low" signal is active or true at a logic low voltage, and active low signals are designated with an overbar. The symbol "$" indicates that the following number is in base-16 (hexadecimal) notation.

Note that several terms may be referred to in various ways. For example, the terms "region" and "block" are used interchangeably. Also, unless specifically noted, the term "memory" includes both volatile and non-volatile memory storage devices, as well as memory-mapped peripheral devices. The $\overline{CE}$, $\overline{OE}$, and $\overline{WE}$ signals are collectively referred to as "chip select" or "CS" signals. Also, like terms are designated similarly or with similar reference numbers between figures.

TABLE 1 defines additional terms useful in understanding the particular embodiment described below, with reference to elements of FIG. 1:

TABLE 1

| Term | Definition |
| --- | --- |
| E-BUS | External bus21. |
| $\overline{CE}$ | Chip enable of the memory or input/output (I/O) device. Chip select circuit 32 activates $\overline{CE}$ and provides it along with the address to the accessed device. For a non-pipelineable device, chip select circuit 32 activates $\overline{CE}$ until the access is complete. For a synchronous pipelineable device, chip select circuit 32 activates $\overline{CE}$ to cause the accessed device to latch the address on the next low-to-high transition of the CLOCK. For a device which provides its own $\overline{AACK}$ signal (ACK_EN = 0), chip select circuit 32 keeps signal $\overline{CE}$ active until the external $\overline{AACK}$ signal is received. |
| $\overline{WE}$ | Write enable of the memory or I/O device. Chip select circuit 32 activates $\overline{WE}$ and provides it along with the data provided by external bus interface 33 to cause the accessed device to latch the data. For a synchronous device, chip select circuit 32 activates $\overline{WE}$ to clock in the data on the next low-to-high transition of the CLOCK. |
| $\overline{OE}$ | Output enable of the memory or I/O device. Chip select circuit 32 activates $\overline{OE}$ to cause the accessed device to provide its data on external bus 21 during read cycles. |
| Burstable Device | Synchronous device (i.e., one using the external bus CLOCK to time memory accesses) which can accept one address and drive out multiple data elements. Note that devices with fast static column accesses (i.e., that require address incrementing) are not considered to be burstable. |
| Beat | In a burst data transfer, the burst has a number of data pieces, each of which is a data beat. |
| Overlap | A condition in which two memory accesses are aligned such that the address phase of the second access occurs at the same time as the data phase of the first access. |
| Pipelineable Device | A condition in which a device can latch the address presented to it, without requiring the address to be valid on its address pins for the duration of the access to the device. A synchronous pipelineable device latches the address at the rising edge of the CLOCK when its $\overline{CE}$ is activated. |

TABLE 1-continued

| Term | Definition |
| --- | --- |
| Address Space | The range of addressing of CPU core 31. The address space may be broken into regions (also referred to as blocks). Each region can be occupied by one or more memory chips, depending on the chip's data width. All chips in the region, however, have one or more common $\overline{CE}$ signals. |
| $\overline{BDIP}$,$\overline{LAST}$ | Early termination control signals for burstable devices. |
| Hold off | A device with hold off capability can hold off its data output until the data bus is available to the device. To be able to hold off the data, the device needs an $\overline{OE}$ control input, and if the device is burstable, it also needs the ability to suspend its internal state machine from advancing to the next data beat until the data bus has been granted to it. |

Figure 11:
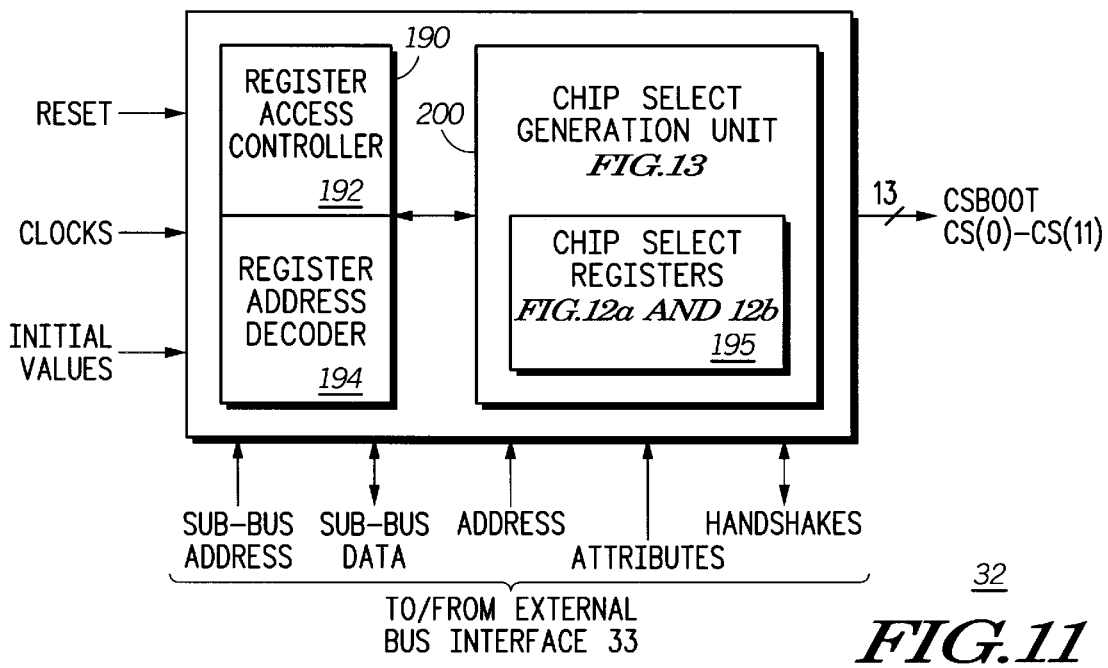
FIG. 11 illustrates in block diagram form a functional block diagram of a particular embodiment of the chip select circuit of FIG. 1.

FIG. 11 illustrates in block diagram form a functional block diagram of a particular embodiment of chip select circuit 32 of FIG. 1. Chip select circuit 32 in general has three signal interfaces. First, chip select circuit 32 receives a reset signal labelled "RESET" which is global to data processor 30, a set of clock signals labelled "CLOCKS" which includes both internal operating clock signals and the external bus clock signal CLOCK, and a set of signals labelled "INITIAL VALUES". Upon reset (signal RESET active), data processor 30 samples external data bus pins to obtain the INITIAL VALUES, and chip select circuit 32 uses the INITIAL VALUES to set the values of some of its registers. On reset, other registers assume default values, which are further described below.

Second, chip select circuit 32 has an interface to external bus interface 33. CPU core 31 accesses registers internal to chip select circuit 32 by performing read and write cycles to corresponding memory-mapped locations. Upon detecting such an access, external bus interface 33 controls the access to chip select circuit 32 through a special-purpose bus which includes an address bus input labelled "SUB-BUS ADDRESS" and a bidirectional data path labelled "SUB-BUS DATA". Other control signals for accessing the registers of chip select circuit 32 are transmitted to or from external bus interface 33 through a set of signals labelled "HANDSHAKES". The generation of control signals for accessing registers of a memory-mapped peripheral are well-known and will not be further described. However, various HANDSHAKES which relate to the external bus transfers are conducted between external bus interface 33 and chip select circuit 32. These transfer HANDSHAKES are described in TABLE 2 below:

TABLE 2

| Transfer HANDSHAKE | Meaning |
| --- | --- |
| $\overline{TS}$ | Transfer start. External bus interface 33 activates this signal for one clock cycle at the beginning of a bus access. |
| $\overline{AACK}$ | ADDRESS acknowledge. This signal terminates the address phase of a bus cycle, allowing external bus interface 33 to initiate another access. |
| $\overline{BI}$ | Burst inhibit. This input signal indicates that the addressed device does not have burst capability. |
| $\overline{BDIP}$ | Burst data in progress. This signal indicates when one or more data beats remain in a fixed burst access. |
| $\overline{TA}$ | Transfer acknowledge. This signal indicates normal completion of the data phase of a bus cycle, or of each beat during burst accesses. |

TABLE 2-continued

| Transfer HANDSHAKE | Meaning |
| --- | --- |
| $\overline{TEA}$ | Transfer error acknowledge. This input signal terminates the bus cycle under bus error conditions. |
| $\overline{ARETRY}$ | Address retry. This signal is associated with the address phase of a bus cycle, and overrides the activation of $\overline{AACK}$ and causes external bus interface 33 to re-arbitrate and re-drive the ADDRESS. |

Pertinent ones of these signals will be described in greater detail in the following description.

Chip select circuit 32 also has an input for receiving the 32-bit address external bus interface 33 provides to external bus 21, labelled "ADDRESS", and another input for receiving signals representing the attributes of the access in progress, labelled "ATTRIBUTES". Table 3 lists the particular ATTRIBUTES which are used by chip select circuit 32:

TABLE 3

| Attribute Signal Name | Meaning |
| --- | --- |
| $RD/\overline{WR}$ | indicates whether the current bus cycle is a read cycle or a write cycle |
| SUPER | if active, indicates that the current cycle is a supervisor access cycle; if inactive, indicates that the current cycle is a user access cycle |
| $INSTR/\overline{DATA}$ | if active, indicates that the current cycle is an instruction access cycle; if inactive, indicates that the current cycle is a data access cycle |
| $\overline{BURST}$ | indicates that the transfer is a burst transfer |
| $\overline{BE0}$–$\overline{BE3}$ | indicates which byte or bytes are enabled during a cycle. $\overline{BE0}$ indicates that data lane D0–D7 contains valid data. $\overline{BE1}$ indicates that data lane D8–D15 contains valid data. $\overline{BE2}$ indicates that data lane D16–D23 contains valid data. $\overline{BE3}$ indicates that data lane D24–D31 contains valid data. |

Third, chip select circuit 32 includes an interface to external devices including thirteen chip select signals labelled "$\overline{CSBOOT}$" and "$\overline{CS(0)}$–$\overline{CS(11)}$". These signals will be described in greater detail in conjunction with FIG. 13 below.

As illustrated in FIG. 11, chip select circuit 32 includes generally two portions: a register access circuit 190 and a chip select generation unit 200. Register access circuit 190 includes a register access controller 192, and a register address decoder 194. Register access controller 192 is a state machine providing control signals for accesses into the registers of chip select circuit 32. Register address decoder 194 detects which register of chip select circuit 32 is being accessed. Register access circuit 190 is connected to chip select generation unit 200 for accessing into chip select registers 195.

Figures 12A, 12B:
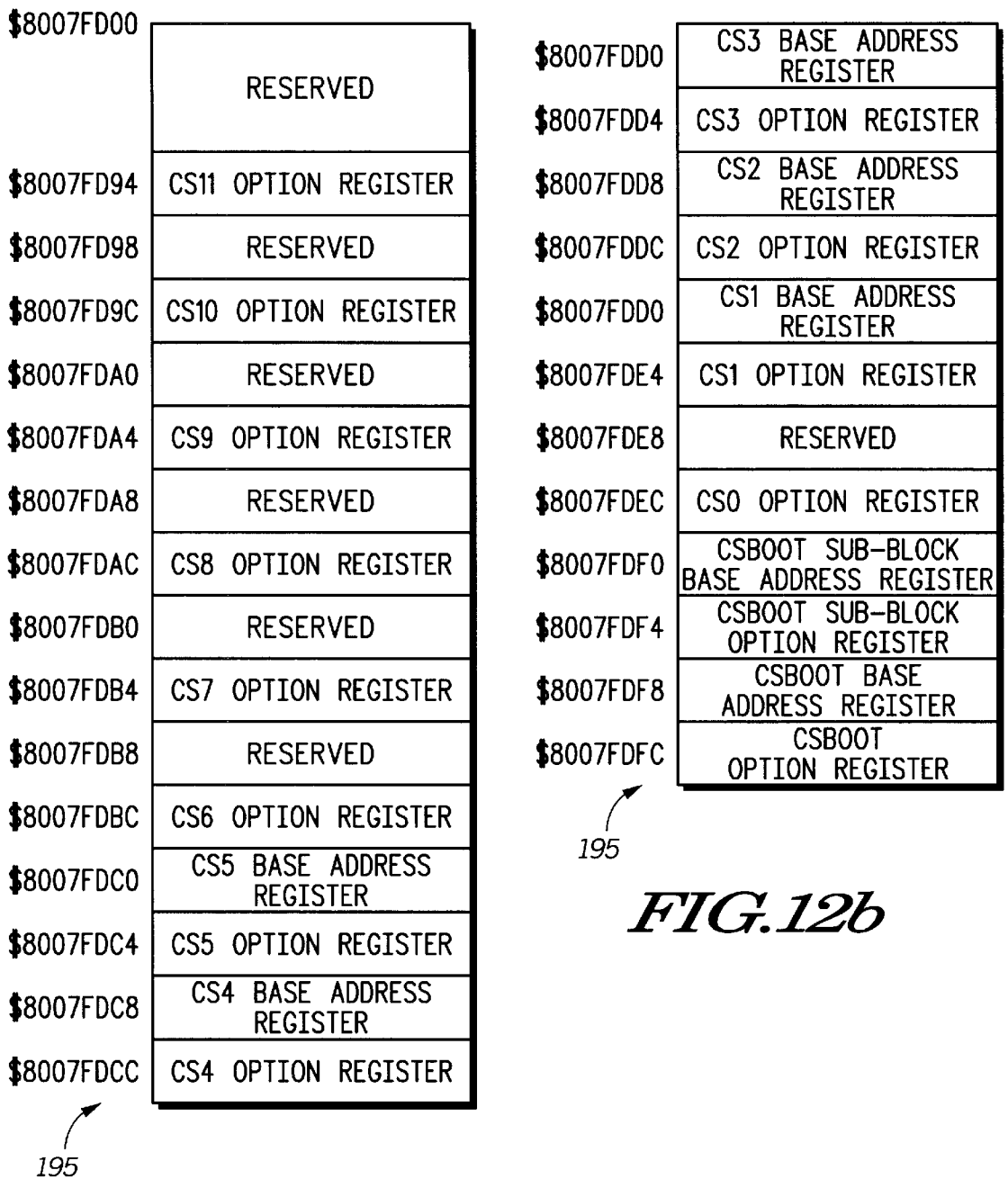
FIGS. 12a and 12b illustrate in block form an address map of the registers of the chip select circuit of FIG. 1.

Chip select registers 195 are memory-mapped registers as illustrated in FIGS. 12a and 12b, which illustrate in block diagram form an address map of chip select registers 195. While the location of these registers in memory is arbitrary, they are preferably implemented in a way that allows for future expansion. For example, chip select circuit 32 supports six regions plus a dedicated sub-region, and has a total of thirteen chip select signals. Each chip select signal which corresponds to a unique region has both a base address register and an option register; each of the other seven chip select signals only have option registers. However, adjacent locations in the memory map to these six option registers are reserved, allowing derivative integrated circuits to support added functionality by adding base address registers. The functions of the registers in chip select circuit 32 will be described in detail in conjunction with FIG. 13 below.

Figure 13:
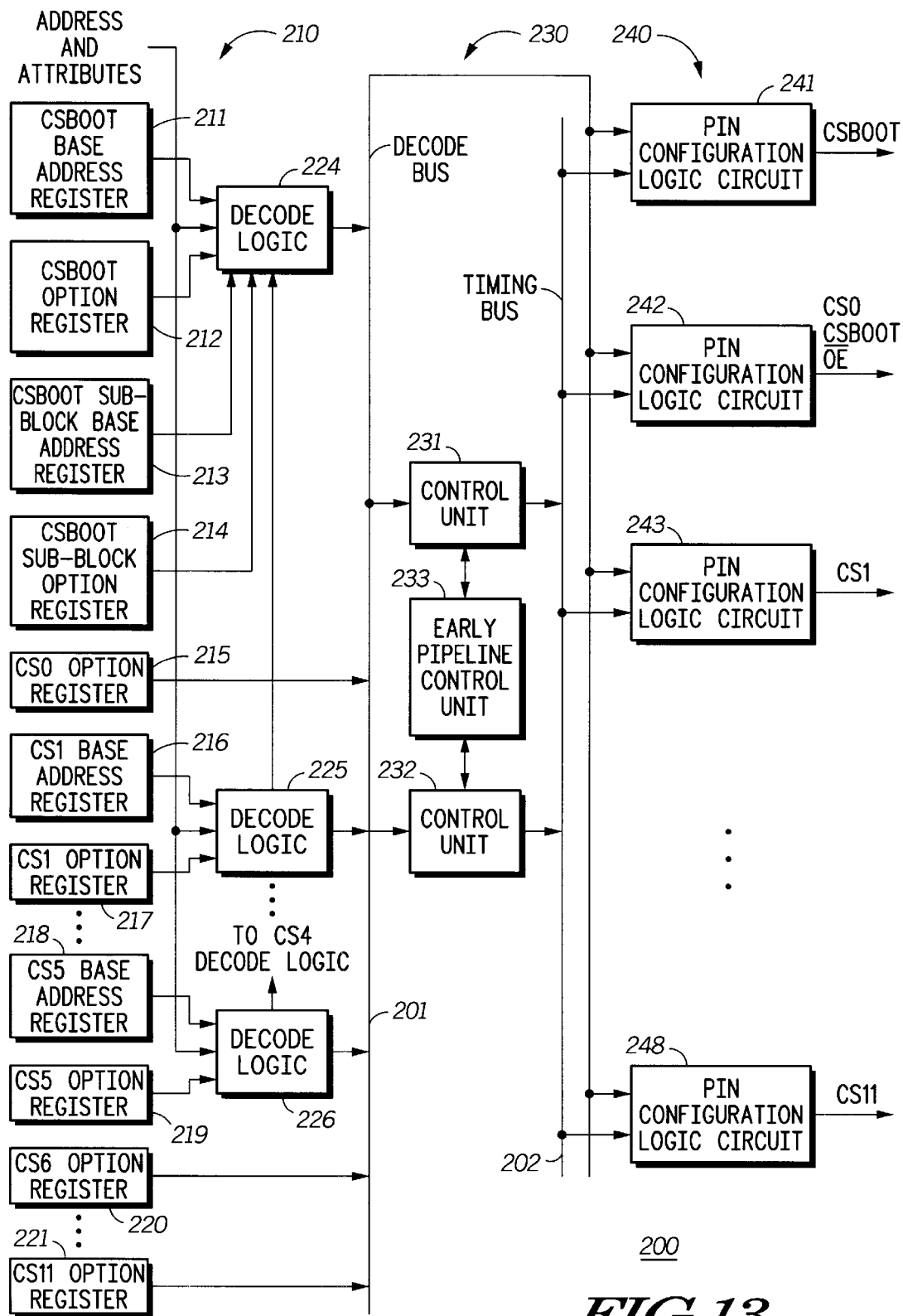
FIG. 13 illustrates in block diagram form the chip select generation unit of FIG. 11.

FIG. 13 illustrates in block diagram form chip select generation unit 200 of FIG. 11. Chip select generation unit 200 includes generally two buses for the interconnection of signals, namely a DECODE BUS 201 and a TIMING BUS 202. Chip select generation unit 200 also includes an address decode stage 210, a timing control stage 230, and a pin configuration stage 240. Chip select generation unit 200 is just one possible embodiment of modular chip select control circuit 80 of FIG. 8, using its modularity and reconfigurability to implement a chip select circuit suited for a high-performance microcontroller. Chip select generation unit 200 defines six regions using six address decoders, plus one dedicated sub-region, and has seven additional option registers to define chip select signals used for accesses to the six regions. Chip select generation unit 200 also includes two control units to implement a two-deep pipeline, and has thirteen programmable chip select pins. One of the six regions is a special boot region, which is active on reset to allow accesses to a non-volatile memory device which stores the boot routine. Part of the boot routine may then program the remaining regions.

Chip select generation unit 200 implements a multi-level protection mechanism by pairing regions to provide two- and three-level region nesting. To implement this feature, chip select generation unit 200 defines the boot region (also known as the CSBOOT region or Region 0) as a main region, paired with Region 1. By being paired with Region 0, Region 1 is capable of being a sub-block at a higher priority within Region 0. Regions 2 and 4 are also main blocks, paired with Regions 3 and 5, respectively, which are capable of being sub-blocks within these blocks at a higher priority.

In addition, chip select generation unit 200 has an additional decoder for defining a dedicated sub-block ("BOOT SUB-BLOCK") which is paired with Region 0. This dedicated sub-block decoder allows up to three-level nesting. The priority scheme for implementing three level nesting is as follows: Region 1 is at a higher priority than the BOOT SUB-BLOCK, which is at a higher priority than Region 0.

Each region in chip select generation unit 200 has an associated memory access interface type ("ITYPE") which is defined in an encoded field in a corresponding option register. Chip select generation unit 200 supports eight different interface types. If the ITYPE field in the option register of the accessed region encodes one of these eight legal access types, then timing control stage 230 provides an associated set of timing signals defined by the access type. However, the ITYPE field may also be encoded in a reserved state. If the ITYPE field is in a reserved state, for example as a result of a software error, the decode logic block of the associated region prevents the access from taking place. Thus, chip select generation unit 200 prevents these errors from causing erroneous memory accesses.

One interface type allows a synchronous read access to a region and provides an early synchronous $\overline{OE}$ signal. This access type is known as the "synchronous interface with early synchronous output enable". This access type is appropriate for synchronous memory or memory-mapped peripheral devices requiring at least one wait state. During an access using this access type, a control unit in timing control stage 230 activates the $\overline{OE}$ signal during one clock period and external bus interface 33 latches the data during a subsequent clock period. This access type allows chip select generation unit 200 to perform an address phase of a second cycle before the completion of the data phase of the first cycle for accesses to memory devices having at least one wait state. When the access is to a burstable device, timing control stage 230 supports a similar access type known as the "synchronous burst read with synchronous output enable".

Another interface type provides the feature of early overlapping of accesses to the region. This access type is known as the "synchronous interface with synchronous output enable and early overlap" type. For this interface type, timing control stage 230 begins a subsequent access one clock cycle early, by performing an address phase of this subsequent access during the clock cycle in which it provides the $\overline{OE}$ signal for the second access.

Timing control stage 230 also supports a two-deep pipeline depth by enforcing a set of pipelining rules. These rules ensure data integrity and proper cycle termination. The rules determine whether a second access can begin during the pendency of a first access, by examining such factors as whether the access is a read access or a write access, whether the access is to a region defined by chip select generation unit 200, whether the access is to a region with a synchronous or an asynchronous interface type, and whether the accessed device is burstable, can hold off its data, and provides its own transfer acknowledge signal.

Pin configuration stage 240 supports the two control units in timing control stage 230 to allow a pipeline depth of two. Each of the thirteen pin configuration logic circuits in pin configuration stage 240 marks whether a first or a second cycle "owns" the associated pin. Each pin configuration logic circuit uses the timing associated with its selected pin function to provide the chip select signal during the first cycle if the attributes of the cycle, such as an access to a region programmed in the pin function register, are met. During the second cycle, each pin configuration logic circuit further obeys the timing associated with the selected pin function if the attributes of that cycle are also met.

These and additional features of chip select generation unit 200 are described more fully below by considering each stage in turn.

Address Decode Stage 210

Address decode stage 210 defines up to seven different programmable regions. The first of these seven regions is designated the boot region, or alternately, Region 0. There are two registers 211 and 212 associated with the boot region, and one decode logic block 224. Register 211, labelled "CSBOOT BASE ADDRESS REGISTER", serves as the base address register for the boot region. Register 211 implements 20 bits out of 32 possible bits. Bits 0–19 designate the base address for the boot region, with bit 0 of register 211 corresponding to bit 0 of the ADDRESS, bit 1 of register 211 corresponding to bit 1 of the ADDRESS, and so on. In this bit ordering scheme, bit 0 represents the most significant bit, and bit 31 of the ADDRESS representing the least significant bit.

Upon reset, this field defaults to either $00000 if an INITIAL VALUE bit known as the interrupt prefix bit (IP) is equal to 0, or to $FC000 if (IP=1), and is software programmable following reset. Note that the default CSBOOT region, defined by the default base address and the default block size, must include the address of the reset vector (memory location of the initial program counter) of CPU core 31. Although the base address of this region may be programmed to any address within the address map, it must not overlap with other blocks or modules in data processor 30. At power-on, the address of the boot device may match that of an internal module, such as an internal EPROM of data processor 30 used for storing instructions. If this occurs, however, data processor 30 includes additional circuitry, not shown, to cause the internal access to override the external access. The internal access is allowed to take place to provide the boot instructions, and chip select generation unit 200 does not perform an external access. Bits 20–31 of CSBOOT BASE ADDRESS REGISTER are reserved.

Register 212, labelled "CSBOOT OPTION REGISTER", is the option register for the boot region. It is a 32-bit register whose bits are defined as indicated in TABLE 4 below:

TABLE 4

| Bit Number(s) | Mnemonic | Functional Description |
|---|---|---|
| 0–3 | BSIZE | Block Size. This field determines the size of the block associated with the base address (TABLE 4-1). |
| 4 | SBLOCK | Sub-block. If set, the address space specified by the base address register is a sub-block within a larger main block. The main block is specified by the paired base address registers. (TABLE 4-2). |
| 5 | SUPER | Supervisor only. If set, the bit indicates that the block is for supervisor access only. If clear, the block can be accessed by supervisor or user. |
| 6 | DSPACE | Data space only. If set, the address block contains only data and no instructions may be accessed from the region. If clear, the block may contain both instructions and data. |
| 7 | WP | Write protect. If set, this address block is read only. If clear, the block is available for both read and write accesses. |
| 8 | CI | Cache inhibit. If set, this bit indicates that the data in the region should not be cached. |
| 9–12 | Unused | Unused. |
| 13 | ACK_EN | Acknowledge enable. If set, chip select circuit 32 returns the transfer acknowledge $\overline{TA}$ and address acknowledge $\overline{AACK}$ fields for the region as determined by the TA_DLY field and ITYPE field, respectively. |
| 14–16 | TA_DLY | $\overline{TA}$ delay. This field indicates the latency of the region of between zero and seven wait states. (TABLE 4-3) |
| 17–18 | PS | Port size. These bits indicate the port size of the region. The default port size is 32 bits. (TABLE 4-4) |
| 19–20 | PCON | Pin configuration. These bits configure the pin to be $\overline{CE}$, $\overline{WE}$, $\overline{OE}$, or a non chip select function. If the pin is a $\overline{CE}$ pin, the REGION field does not affect it, since each $\overline{CE}$ pin has its own base address register and decoding logic. (TABLE 4-5) |
| 21–22 | BYTE | Byte. This field is only applicable if the pin is configured as a $\overline{WE}$ pin. Chip select circuit 32 uses this field to determine which of the four byte enables of the E-bus it should activate $\overline{WE}$ for. Typically, a writeable region would have multiple $\overline{WE}$s, one $\overline{OE}$, and one $\overline{CE}$. (TABLE 4-6) |
| 23–25 | REGION | Memory region. This field is applicable only if the pin is configured to be a $\overline{WE}$ or an $\overline{OE}$ pin. These bits indicate which memory region the pin is used for. If these bits have a value of zero, the corresponding chip select decoder is disabled. (TABLE 4-7) |
| 26–27 | Unused | Unused. |
| 28–31 | ITYPE | Interface type. These bits indicate the type of memory or peripheral device being controlled. (TABLE 4-8) |

Certain bit fields are further illustrated in TABLEs 4-1 through 4-8 below, as indicated in TABLE 4. The BSIZE field defaults to $F for the CSBOOT OPTION REGISTER on reset. However, in an alternate embodiment, the BSIZE field could be another value, such as 1 megabyte (1M), as long as the reset vector of CPU core 31 still is within the default CSBOOT region. TABLE 4-1 illustrates the encoding of the BSIZE field:

TABLE 4-1

| BSIZE Field (Binary) | Block Size (Byte) | Address Lines Compared |
|---|---|---|
| 0000 | Invalid | This encoding indicates that the bit values in the base address register and option register are invalid or have not been configured. Accesses to external devices using these registers are not possible until they have been configured. |
| 0001 | 4K | A0–A19 |
| 0010 | 8K | A0–A18 |
| 0011 | 16K | A0–A17 |
| 0100 | 32K | A0–A16 |
| 0101 | 64K | A0–A15 |

TABLE 4-1-continued

| BSIZE Field (Binary) | Block Size (Byte) | Address Lines Compared |
|---|---|---|
| 0110 | 128K | A0–A14 |
| 0111 | 256K | A0–A13 |
| 1000 | 512K | A0–A12 |
| 1001 | 1M | A0–A11 |
| 1010 | 2M | A0–A10 |
| 1011 | 4M | A0–A9 |

TABLE 4-1-continued

| BSIZE Field (Binary) | Block Size (Byte) | Address Lines Compared |
|---|---|---|
| 1100 | 8M | A0–A8 |
| 1101 | 16M | A0–A7 |
| 1110 | 32M | A0–A6 |
| 1111 | 64M | A0–A5 |

Bit 4, the SBLOCK bit, designates whether the region is to be a sub-block within a larger main block. Different blocks are paired together, as shown in TABLE 4-2 below:

TABLE 4-2

| Main Block | Sub-Block |
|---|---|
| CSBOOT | CS1 |
| CS2 | CS3 |
| CS4 | CS5 |

In addition to these pairings, as noted above, the boot region has an additional dedicated sub-block. If the SBLOCK bit in register 212 is set, then the CS0 block is the main block and the CS1 block is the sub-block. On reset, this bit defaults to 0.

The SUPER bit for the CSBOOT OPTION REGISTER defaults to 1 on reset, since CPU core 31 will begin accessing instructions after reset in the supervisor mode. The DSPACE bit defaults to 0 on reset. The WP bit for the CSBOOT OPTION REGISTER defaults to 1 on reset, since boot instructions will generally be fetched from a nonvolatile, read-only memory device. The CI bit is cleared to 0 on reset, since instructions from the boot routine are likely to be cacheable.

The ACK_EN bit is set to 1 on reset, and corresponding INITIAL VALUE bits provide the initial TA_DLY field value. TABLE 4-3 illustrates the encoding of the TA_DLY field:

TABLE 4-3

| TA_DLY (Binary) | Number of Wait States |
|---|---|
| 000 | zero |
| 001 | 1 |
| 010 | 2 |
| 011 | 3 |
| 100 | 4 |
| 101 | 5 |
| 110 | 6 |
| 111 | 7 |

The initial PS field is an INITIAL VALUE as well, and its encoding is illustrated in TABLE 4-4 below:

TABLE 4-4

| PS (Binary) | Port Size |
|---|---|
| 00 | Reserved |
| 01 | 16-bit port |
| 10 | 32-bit port |
| 11 | Reserved |

The PCON field, whose encoding is shown in TABLE 4-5 below, is cleared to 00 on reset for the CSBOOT region:

TABLE 4-5

| PCON (Binary) | Pin configured as |
|---|---|
| 00 | Chip Enable ($\overline{CE}$) |
| 01 | Write Enable ($\overline{WE}$) |
| 10 | Output Enable ($\overline{OE}$) |
| 11 | Non chip select function |

Note that the PCON field serves the purpose of pin function register 130. In other embodiments, a separate pin function register may be used.

The BYTE field, whose encoding is shown in TABLE 4-6 below, is cleared to 00 on reset:

TABLE 4-6

| BYTE (binary) | Pin generates $\overline{WE}$ for: |
|---|---|
| 00 | Byte enable 0 |
| 01 | Byte enable 1 |
| 10 | Byte enable 2 |
| 11 | Byte enable 3 |

The REGION field, which is a don't care on reset, is initially cleared to 000. The encoding for the REGION field is shown in TABLE 4-7 below:

TABLE 4-7

| REGION (binary) | $\overline{WE}/\overline{OE}$ pin belongs to memory region of: |
|---|---|
| 000 | CSBOOT |
| 001 | CS1 |
| 010 | CS2 |
| 011 | CS3 |
| 100 | CS4 |
| 101 | CS5 |
| 110 | not used |
| 111 | not used |

Finally, the initial ITYPE field is also an INITIAL VALUE. The encoding of the ITYPE field is shown in TABLE 4-8 below:

TABLE 4-8

| ITYPE Field (binary) | Device Interface Access Type |
|---|---|
| 0000 | Generic asynchronous region with output buffer turn off time of less than or equal to one clock period. A device with this interface type is not pipelineable. |
| 0001 | Generic asynchronous region with output buffer turn off time of two CLOCK periods. A device with this interface type is not pipelineable. |
| 0010 | Synchronous region with an asynchronous $\overline{OE}$. A device with this interface type is pipelineable, can function as an asynchronous device, and has the ability to hold off its internal data on read accesses until $\overline{OE}$ is activated. |
| 0011 | Synchronous region with an early synchronous $\overline{OE}$. A device with this interface type is pipelineable, can function as an asynchronous device, and has the ability to hold off its internal data on a read access until $\overline{OE}$ is activated. A device accessed by this interface type must have at least one wait state and if TA_DLY indicates zero wait states, chip select circuit 32 generates the $\overline{OE}$ as if the region had one wait state. |
| 0100 | Reserved. If erroneously programmed, the corresponding pin remains inactive. |
| 0101 | Burstable region with only a fixed burst access capability. This interface has an $\overline{OE}$, is pipelineable, and can hold off its internal data until $\overline{OE}$ is activated. This interface may |

TABLE 4-8-continued

| ITYPE Field (binary) | Device Interface Access Type |
|---|---|
| | function as an asynchronous interface, but provides data only after the number of wait states required by the interface and the activation of $\overline{OE}$. In this mode, the interface will keep the first data beat valid until the $\overline{BDIP}$ signal indicates that it should send out the next data. The $\overline{OE}$ for this region is an asynchronous $\overline{OE}$. |
| 0110 | Reserved. If erroneously programmed, the corresponding pin remains inactive. |
| 0111 | Burstable region with only fixed burst access capability, but the interface has an $\overline{OE}$, is pipelineable, and can hold off its internal data until $\overline{OE}$ is activated. This interface may function as an asynchronous interface, but provides data only after the number of wait states required by the interface and $\overline{OE}$ is activated. In this mode, the interface will keep the first data beat valid until the $\overline{BDIP}$ signal indicates that it should send out the next data. The $\overline{OE}$ for this region is a synchronous $\overline{OE}$. |
| 1000 | Burstable region with fixed burst access only. This interface contains a wait state counter and may not have an $\overline{OE}$ so the device will drive the data out after the number of wait states it requires. This type cannot hold off its internal data until the data bus is available so it is not very pipelineable. This interface may function as an asynchronous interface, but provides data only after the number of wait states has been satisfied and will keep the first data beat valid for only one clock. |
| 1001 | Same as ITYPE = 0011 with the added feature of early overlapping of accesses to the region. This type of interface must be able to pipeline another access to it a CLOCK period before it drives valid data out on read or receives data on write for the previous access. |
| 1010–1111 | Reserved. If erroneously programmed, the corresponding pin remains inactive. |

The boot region has a dedicated sub-block associated with it. Register 213, designated "CSBOOT SUB-BLOCK BASE ADDRESS REGISTER", is the base address register for this dedicated sub-block and register 214, designated "CSBOOT SUB-BLOCK OPTION REGISTER", is the option register. Register 213 has the same field encodings as register 211; however, register 214 includes only the fields necessary to implement the multi-level protection function. Register 214 includes the BSIZE, SBLOCK, SUPER, DSPACE, WP, and CI fields in bits 0–8 as defined in TABLEs 3 and 3-1 above, all of which are cleared to 0 on reset. Bits 9–31 are unused. To ensure proper operation of chip select generation unit 200, the BSIZE field in this and any other option register of a block which is to be a sub-block must be less than the BSIZE of the main block. Note, however, that other embodiments could support partially overlapping regions with additional logic circuitry. Decode logic block 224 is responsive to bits in both Region 0 registers 211 and 212, and dedicated boot sub-block registers 213 and 214.

A second region is designated the CS1 region, or alternately, Region 1. There are two registers 216 and 217 associated with the Region 1, and one decode logic block 225. Register 216, labelled "CS1 BASE ADDRESS REGISTER", serves as the base address register for Region 1. Register 216 is a 32-bit register. Like register 211, bits 0–19 designate the base address for Region 1, with bit 0 corresponding to bit 0 of the ADDRESS, bit 1 corresponding to bit 1 of the ADDRESS, and so on, with bits 20–31 being reserved. Upon reset, this field defaults to $00000. Although the base address of this region may be programmed to any address within the address map, it must not overlap with other blocks or modules in data processor 30. Register 217, labelled "CS1 OPTION REGISTER", is the option register for region 1. It is a 32-bit register with the same encodings as for register 212, as defined in TABLE 4 above. On reset, all bits default to zero, except for the PCON field, which defaults to $0 if data processor 30 is in chip select mode, or $3 otherwise.

Address decode stage 210 includes five other option registers corresponding to the other five regions. FIG. 13 illustrates representative option registers 217 and 219, labelled "CS1 OPTION REGISTER" and "CS5 OPTION REGISTER", and associated with regions 1 and 5, respectively. Each of these option registers has the same bit field definition as register 212. However, on reset, all bits and bit fields are cleared to 0.

Register 215, labelled "CS0 OPTION REGISTER", is an option register corresponding to a pin in pin configuration stage 240, and includes only the PCON, BYTE, and REGION fields as defined above. The PCON field defaults to 2 on reset if this pin is in chip select mode, or 3 otherwise; fields BYTE and REGION default to 0. The option registers which are not associated with a particular region, including representative registers 220 and 221 labelled "CS6 OPTION REGISTER" and "CS11 OPTION REGISTER", have the same bit field definitions as register 215. However, on reset, field PCON is cleared to 0 if the corresponding pin is in chip select mode, and is set to 3 otherwise. Like register 215, the BYTE and REGION fields in these additional option registers are cleared to 0 on reset.

Associated with the boot region is a decode logic block 224. Registers 211, 212, 213, and 214 each provide their bits as outputs to decode logic block 224. In addition, in order to dedicate block 1 as a paired sub-block to block 0 (in addition to the dedicated boot sub-block), a decode logic block 225 associated with block 1 provides output signals to an input of decode logic block 224. These output signals are the ADDRESS MATCH and ATTRIBUTE MATCH signals necessary for the multi-level protection mechanism illustrated in FIG. 3. Note that the main block incorporates the function of priority enforcing circuit 58. Decode logic block 224 receives the input ADDRESS and ATTRIBUTES from CPU core 31 through external bus interface 33. Decode logic block 224 first checks whether the ADDRESS is within the boot region or the dedicated boot sub-block. Decode logic block 224 does this by determining whether the ADDRESS is within the BSIZE of the base address field of the corresponding base address register. Next, decode logic block 224 compares the input ATTRIBUTES with those programmed in the corresponding option register.

In the illustrated embodiment, the ADDRESS is a 32-bit address. Decode logic block 224 compares the significant bits of the ADDRESS (as determined by the BSIZE field) against the value stored in the base address register and the BSIZE field in the option register. If all significant address bits match, then decode logic block 224 detects an address match.

Decode logic block 224 decodes the various ATTRIBUTES and checks them against corresponding bits from register 212 as follows. Decode logic block 224 compares the RD/$\overline{WR}$ ATTRIBUTE against the WP bit; if either RD/$\overline{WR}$ is at a logic high or RD/$\overline{WR}$ is at a logic low and WP is cleared, then decode logic block 224 detects an attribute match for this bit. Decode logic block 224 compares the SUPER attribute against the SUPER bit and detects an attribute match for this bit if the SUPER ATTRIBUTE is at a logic high or the SUPER ATTRIBUTE is at a logic low and the SUPER bit is cleared. Decode logic block 224 compares the INSTR/$\overline{DATA}$ ATTRIBUTE against the DSPACE bit, and detects an attribute match for this bit if either INSTR/$\overline{DATA}$ is at a logic low or if INSTR/$\overline{DATA}$ is at a logic high and DSPACE is cleared. If all programmed attributes match the corresponding ATTRIBUTE signals in this manner, then decode logic block 224 detects an ATTRIBUTE MATCH.

If decode logic block 224 detects both an ADDRESS MATCH and an ATTRIBUTE MATCH in a region, it then checks to see if a sub-block at a higher priority will override the match. For example, if decode logic block 224 detects an access to an address within both Region 0 and the dedicated boot sub-block, then the attributes defined in register 214 control whether the access takes place. Decode logic block 224 would inhibit the cycle from taking place if there is no attribute match in the dedicated boot sub-block, even if there is both an address and attribute match within Region 0.

Timing Control Stage 230

Timing control stage 230 includes two control units 231 and 232, and an early pipeline control unit 233 connected between control units 231 and 232. Timing control stage 230 functions as an access state machine to provide chip select signals to external bus 21, and each of control units 231 and 232 has an input connected to DECODE BUS 201 for receiving decoded signals from the decode logic blocks in address decode stage 210 to indicate whether a bus cycle in progress matches the address and attributes of one of the six available regions or of the dedicated boot sub-block. If one of the regions detects a match, one of the control units in timing control stage 230 provides sequential timing information to TIMING BUS 202 to reflect the appropriate timing for the given programmed interface type.

Control unit 231 provides three timing control signals to TIMING BUS 202, namely $\overline{\text{CE1 TIMING}}$, $\overline{\text{OE1 TIMING}}$, and $\overline{\text{WE1 TIMING}}$. Similarly, control unit 232 provides three timing control signals to TIMING BUS 202, namely $\overline{\text{CE2 TIMING}}$, $\overline{\text{OE2 TIMING}}$, and $\overline{\text{WE2 TIMING}}$.

For example, decode logic block 224 in address decode stage 210 recognizes an access to Region 0 and provides control signals to DECODE BUS 201 in response. In timing control stage 230, a control unit such as control unit 231 becomes associated with this bus cycle and provides timing signals to TIMING BUS 202 for this access during the pendency of this access. A second access may take place during the first access and an address decoder in address decode stage 210 may recognize an access to its corresponding programmable region and having attributes matching those programmed in its option register and provide control signals to DECODE BUS 201. Control unit 232 may then begin providing timing signals to TIMING BUS 202 to overlap one or more chip select control signals for this access as determined by the interface type.

Each timing control unit provides the timing signals for each chip select function depending on the ITYPE field in the option register for the region that owns the cycle. Signal timing for the interface types that chip select circuit 32 implements are better understood with reference to FIGS. 14–19. In each of these timing diagrams, successive low-to-high CLOCK transitions are designated as t1, t2, t3, etc. Active or valid times of ADDRESS, DATA, and control signals are designated with a number or numbers to identify the access, as appropriate. Note that these timing diagrams represent typical signal timings. Actual signal timing waveforms will differ as integrated circuit manufacturing process conditions vary. Some signals are provided by external bus interface 33, but are illustrated to allow a better understanding of the interface. In FIGS. 14–19, arrows represent signal dependencies or causation.

Figure 14:
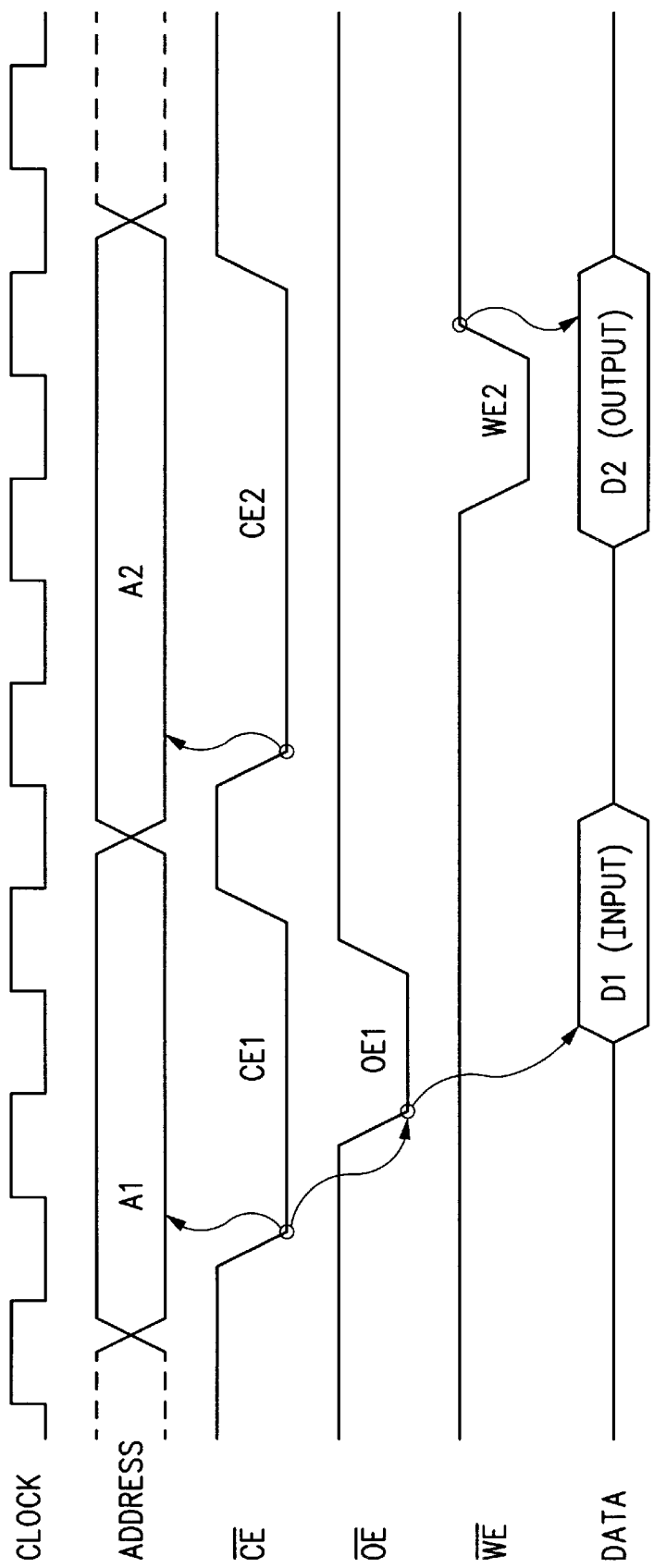
FIGS. 14–19 illustrate timing diagrams for different interface types provided by the control units in FIG. 13.

FIG. 14 illustrates a timing diagram of interface type $0, which is a generic asynchronous interface for accessing zero-wait state, unclocked devices (i.e., devices with an output buffer turn off time of less than or equal to one clock period). The asynchronous interface requires the ADDRESS and the chip select signals ($\overline{\text{CE}}$ and either $\overline{\text{OE}}$ or $\overline{\text{WE}}$) to be valid until the end of the access. Thus a successive access to the same device cannot occur before the completion of the previous access, and no overlapping of accesses is allowed. FIG. 14 illustrates a read cycle, followed by a write cycle. During both the read cycle and the write cycle, the accessed device uses an address such as A1 a delay time after the activation of signal $\overline{\text{CE}}$ such as the falling edge of CE1. During a read cycle, the accessed device provides DATA as an output (and an input to external bus interface 33) within a delay time after the activation of signal $\overline{\text{OE}}$ such as the falling edge of OE1. During the write cycle, the accessed device latches a data element such as D2 (which is an output of external bus interface 33) a delay time after the inactivation of signal $\overline{\text{WE}}$ such as the rising edge of WE2. One example of an asynchronous memory device is the MCM62995A memory chip available from Motorola, Inc., which in addition to having an address latch enable ($\overline{\text{ALE}}$) signal input can also function in an asynchronous mode.

Interface type $1 is similar to type $0, but applies to a generic asynchronous interface for accessing devices with an output buffer turn off time of two clock periods. Thus, the timing of signals pertinent to this access will be similar, but not identical, to those illustrated in FIG. 14. For read cycles, chip select circuit 32 will wait one CLOCK period after it deactivates signal $\overline{\text{OE}}$ before allowing a subsequent device to drive DATA on external bus 21. For a subsequent write cycle, chip select circuit 32 will prevent external bus interface 33 from driving DATA until one clock period after deactivating the previous $\overline{\text{OE}}$.

Figure 15:
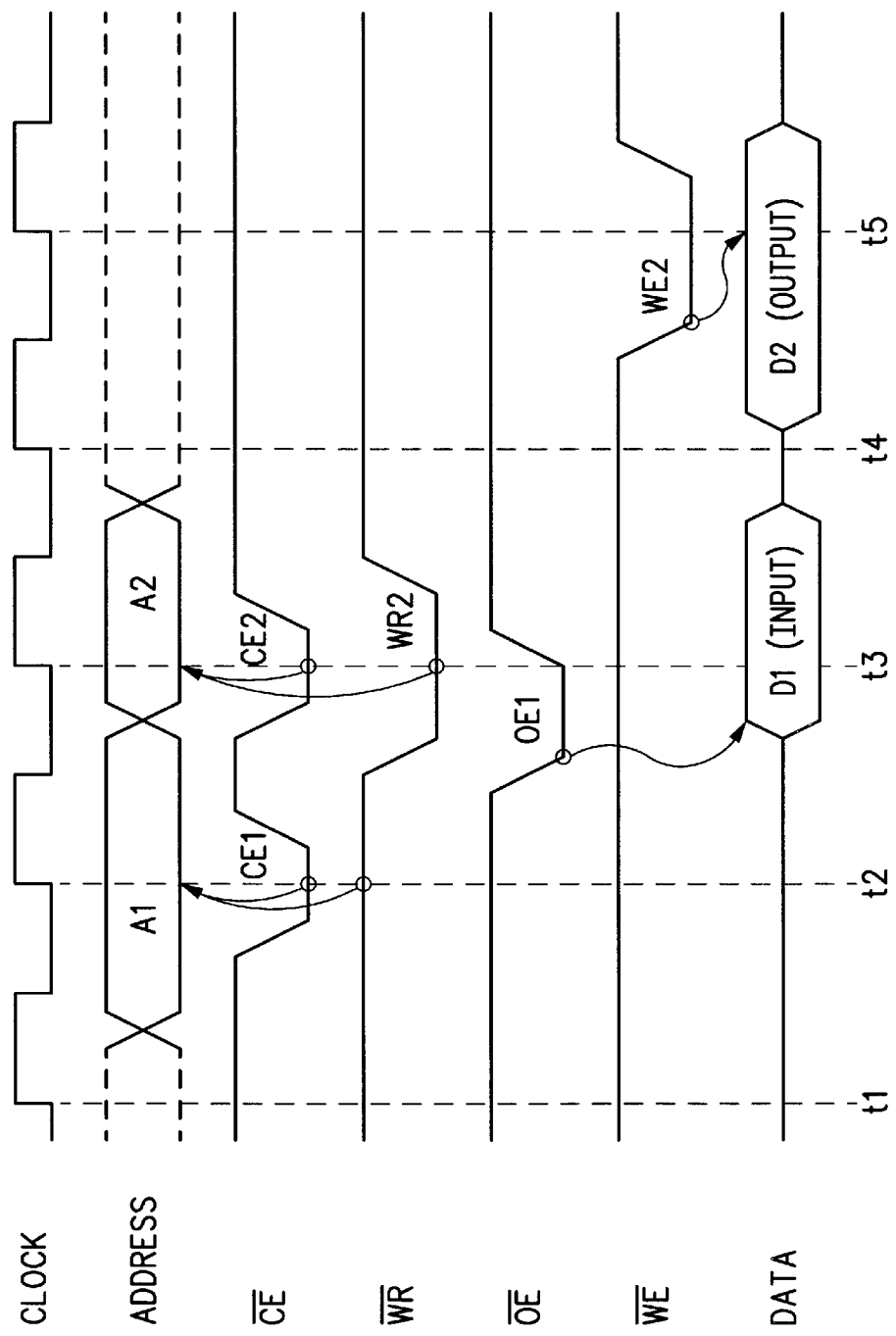

FIG. 15 illustrates a timing diagram of interface type $2, which is a synchronous interface which has an asynchronous $\overline{\text{OE}}$. Memory devices with this synchronous interface have an input for receiving the CLOCK, and latch the ADDRESS and DATA on low-to-high CLOCK transitions. During a read access, the memory device provides data asynchronously in response to signal $\overline{\text{OE}}$. FIG. 15 illustrates a read cycle followed by a write cycle. In addition to the chip select signals, a device with this interface access type observes a write signal labelled "$\overline{\text{WR}}$" provided by external bus interface 33 to determine, during the address phase, whether the access is a read access or a write access. Thus, at t2, the accessed device recognizes that the access is a read access and latches A1. Chip select circuit 32 activates signal $\overline{\text{OE}}$ and the falling edge of OE1 causes the accessed device to provide DATA, which is an input to external bus interface 33.

Memory devices using this interface have the ability to latch the input ADDRESS so that the next access to the same device can be overlapped with the previous access, and such a device can hold off its internal data on read accesses until signal $\overline{\text{OE}}$ is activated. Thus, the address phase of a successive write cycle can overlap the end of the data phase of the read cycle. Chip select circuit 32 activates signal $\overline{\text{CE}}$ prior to t3 to cause the accessed device to latch address A2. Since signal $\overline{\text{WR}}$ is active at t3, the accessed device recognizes a write access. After the completion of the data phase of the read access, chip select circuit 32 activates signal $\overline{\text{WE}}$ to cause the accessed device to latch the data to complete the data phase of the write cycle at t5.

The timing illustrated in FIG. 15 demonstrates in isolation the capability of chip select circuit 32 to overlap two consecutive interface type $2 accesses. However, data processor 30 does not allow this overlap, in order to provide extra protection against possible bus contention. In data processor 30, external bus interface 33 does not provide the appropriate HANDSHAKES to chip select circuit 32 early enough to allow chip select circuit 32 to overlap the address phase of the second access. Thus, external bus interface 33 does not actually provide A2, and chip select circuit 32 does not activate the $\overline{CE}$ and $\overline{WR}$ signals, until a setup time prior to t4.

Interface type $3, known as the "synchronous interface with early synchronous OE", was previously illustrated in FIG. 5. Note that for interface type $3, chip select circuit 32 performs write cycles in the same way as for interface type $2, which was illustrated in FIG. 15.

Interface type $5, known as the "burstable region with fixed burst", has a "Type I" burst interface and uses an asynchronous $\overline{OE}$ signal. Chip select circuit 32 implements a fixed burst length of four cycles. The Type I burst interface uses the $\overline{OE}$ and $\overline{WE}$ signals to cause the accessed device to drive data out or latch data in, respectively. This interface also requires a $\overline{BDIP}$ signal to control when the accessed device should output the next beat of the burst. A Type I burst interface device has an address latch, so the address of the next access to the device can be overlapped with the previous access; i.e., the address of an access does not need to be valid after the ADDRESS has been latched on the low-to-high transition of the CLOCK.

Figure 16:
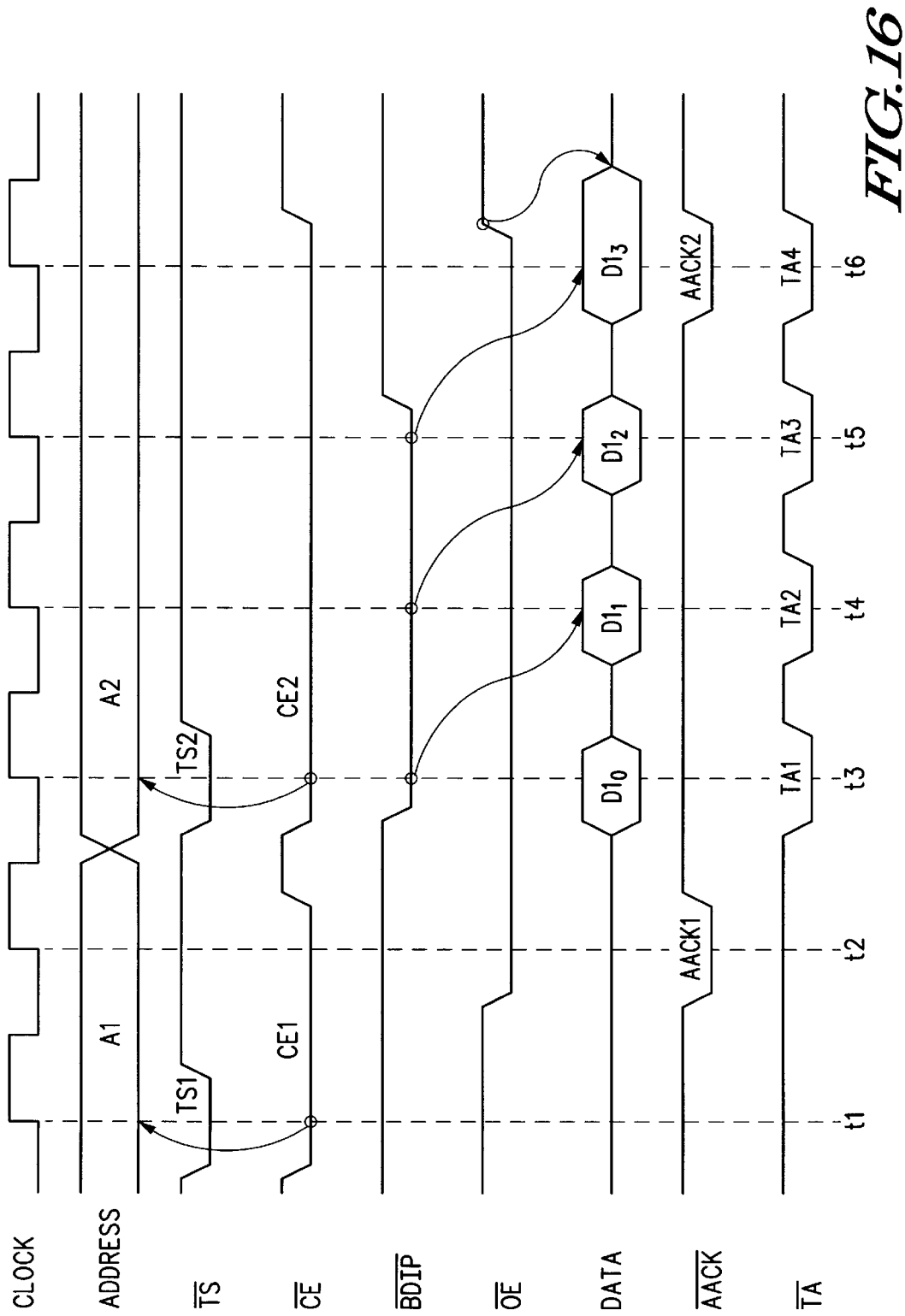

FIG. 16 illustrates a timing diagram example of a read cycle using interface type $5. In the example shown in FIG. 16, the region's ACK_EN bit in the corresponding option register is configured to allow for external acknowledge signals, i.e., cleared. At time point t2, the accessed device synchronously latches the ADDRESS and completes the address phase at time t2 as signified by the activation of signal $\overline{AACK}$. However, at t2, the accessed device keeps signal $\overline{TA}$ inactive, and chip select circuit 32 must insert a wait state. Subsequently, at time t3, the accessed device activates signal $\overline{TA}$ to indicate that it is ready to complete the data phase, and provides a first DATA element $D1_0$. External bus interface 33 activates signal $\overline{BDIP}$ to indicate that it expects the next beat of the burst on the subsequent low-to-high CLOCK transition. External bus interface 33 latches successive data elements $D1_1$, $D1_2$, and $D1_3$ on transitions t4, t5, and t6, respectively. External bus interface 33 deactivates signal $\overline{BDIP}$ prior to t6, signifying that data element $D1_3$ is the last beat of the burst. The accessed device keeps data element $D1_3$ valid until a delay time after the inactivation of signal $\overline{OE}$.

This interface allows the address phase of a subsequent access to be overlapped with the data phase of a prior access, when the same device is accessed for two consecutive cycles. The accessed device recognizes the second access on the last beat of the previous burst. Thus, as illustrated in FIG. 16, external bus interface 33 provides a subsequent address A2 and chip select circuit 32 activates signal $\overline{CE}$ a setup time prior to t3, and the accessed device completes the address phase of this second access by providing signal $\overline{AACK}$ a setup time prior to t6.

Figure 17:
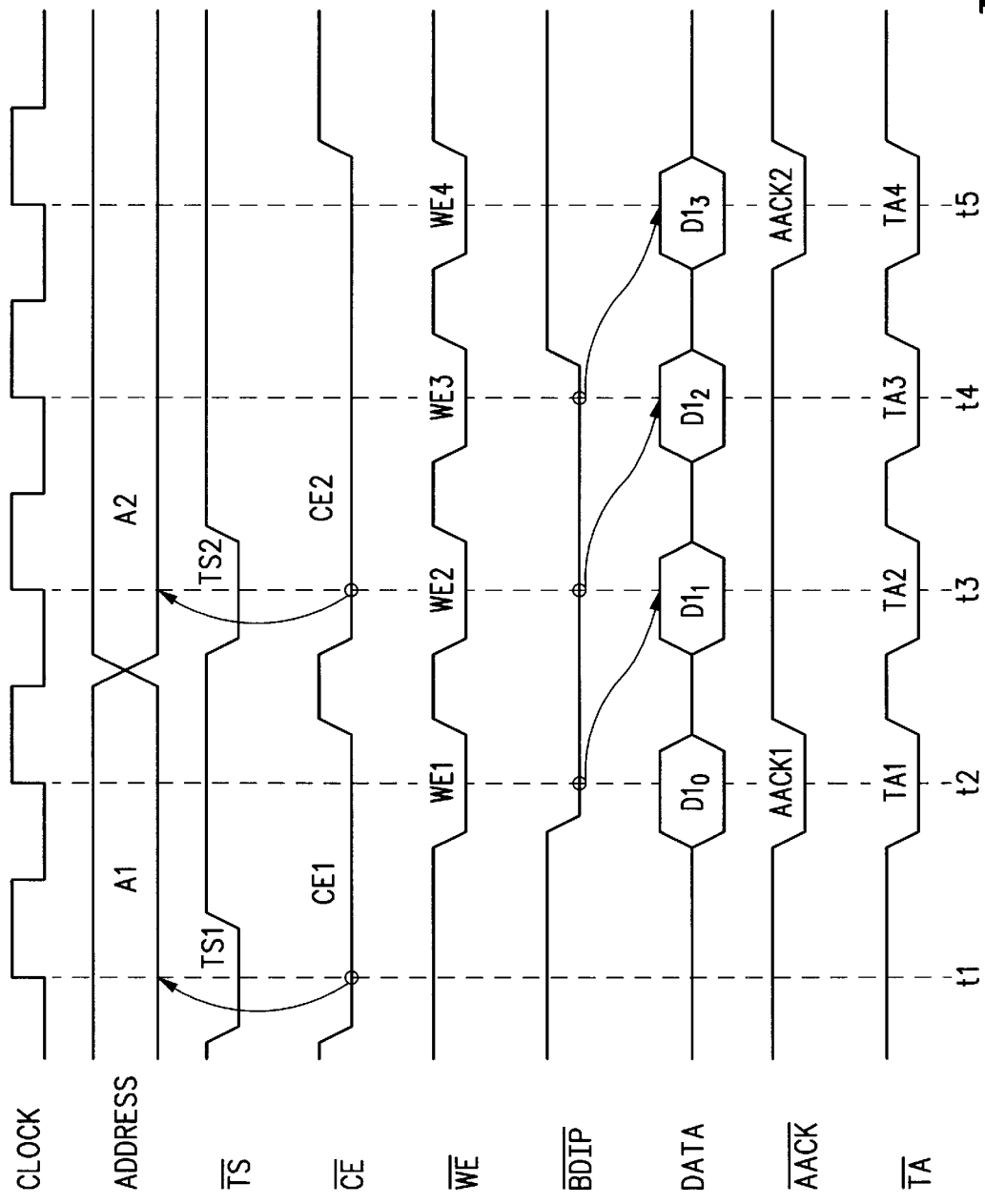

FIG. 17 illustrates a timing diagram of a write cycle using the Type I burst interface (such as interface type $5). As in FIG. 16, the region's ACK_EN bit in the corresponding option register is configured to allow for external acknowledge signals, i.e., cleared. At time t2, the accessed device synchronously latches the ADDRESS and completes the address phase as signified by the activation of signal $\overline{AACK}$. At t2, the accessed device activates signal $\overline{TA}$ to indicate that it is ready to complete the data phase, and latches a first DATA element $D1_0$. Signal $\overline{BDIP}$ is activated to indicate that external bus interface 33 will provide the next beat of the burst on the subsequent low-to-high CLOCK transition. Data processor 30 drives successive data elements $D1_1$, $D1_2$, and $D1_3$ on transitions t3, t4, and t5, respectively. At t5, signal $\overline{BDIP}$ is inactive, signifying that data element $D1_3$ is the last beat of the burst. Like FIG. 16, FIG. 17 illustrates an address phase of an overlapping access, and the address phase of this second access is terminated during the last beat of the burst at time t5.

Interface type $7, known as the "fixed burst with pipelineable $\overline{OE}$", supports the read access previously illustrated in FIG. 6. This interface type can hold off its internal data until signal $\overline{OE}$ is activated. The interface may function as an asynchronous interface, but provides data only after the number of wait states defined by the TA_DLY field and after signal $\overline{OE}$ is activated. Interface type $7 is a Type I interface, whose write cycle timing was illustrated in FIG. 17.

Interface type $8 has a "Type II" burst interface which does not require an $\overline{OE}$ signal, but instead uses a $\overline{LAST}$ signal. When signal $\overline{LAST}$ is activated a setup time prior to a low-to-high CLOCK transition, a Type II device places its data output buffers into a high impedance state following the CLOCK transition. The $\overline{CE}$ signal must remain active for the duration of the device's access latency or wait states. This type of device also requires a $\overline{TS}$ signal.

Figure 18:
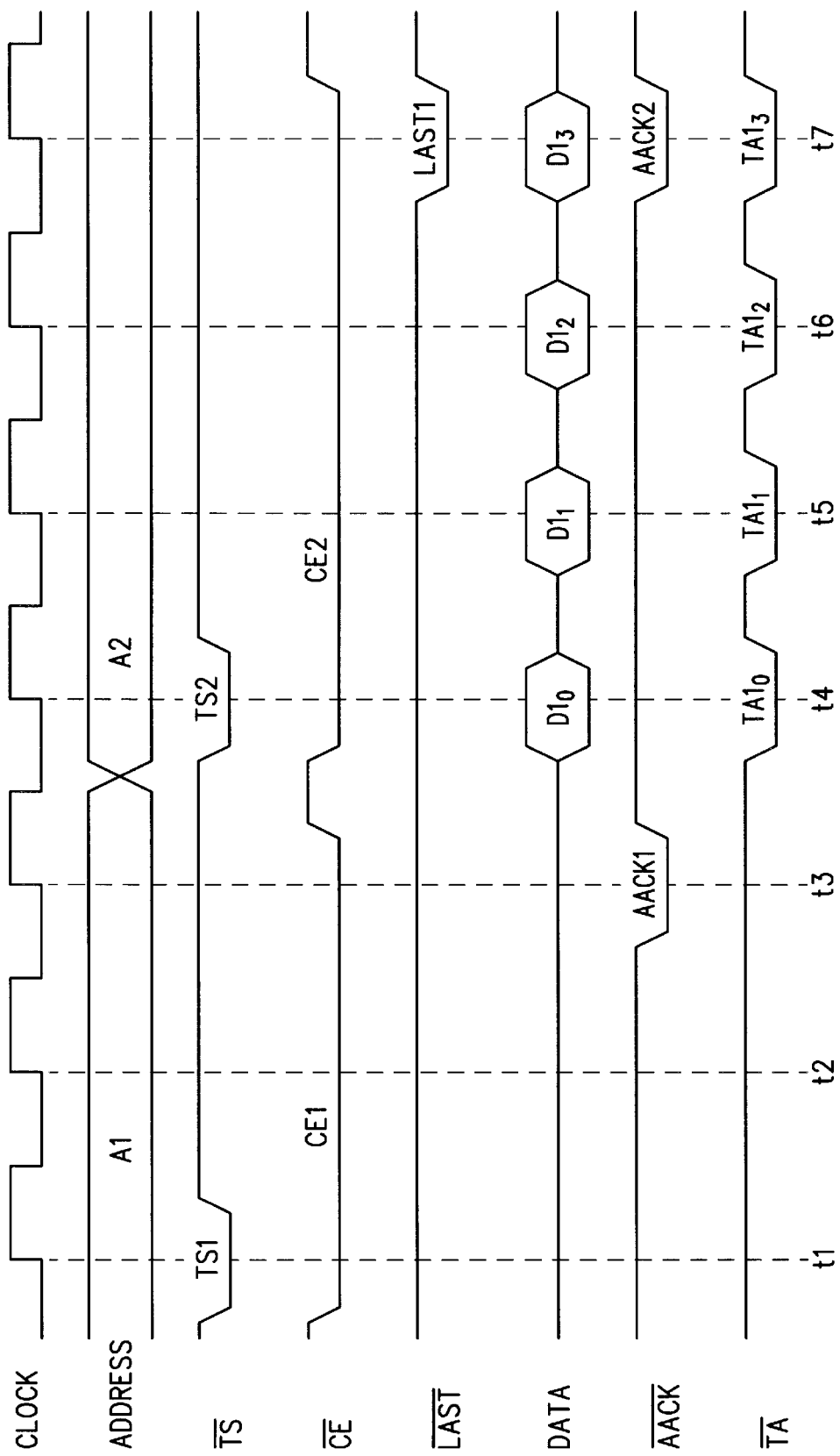

FIG. 18 illustrates a timing diagram of a read interface using access type $8. In the example illustrated, the accessed device has two wait states, and returns its own acknowledge signals. The address phase is not terminated until t3, when the accessed device activates signal $\overline{AACK}$. Under the Type II burst interface, signal $\overline{CE}$ remains active for the duration of the device's latency, and thus $\overline{CE}$ remains active until after t3, when the data phase begins. This interface access type has no $\overline{OE}$ signal. The accessed device activates signal $\overline{TA}$ on consecutive low-to-high CLOCK transitions beginning with t4. The four-beat burst transfer is completed at t7, and the completion is signaled by external bus interface 33 activating signal $\overline{LAST}$.

This interface allows the address phase of a subsequent access to be overlapped with the data phase of a prior access. Thus, as illustrated in FIG. 18, chip select circuit 32 provides a subsequent address A2 and activates signal $\overline{CE}$ a setup time prior to t4. The accessed device recognizes the address phase of the subsequent access and latches A2, as signified by the activation of signal $\overline{AACK}$, at time t7. Signal $\overline{CE}$ must remain active during CE2, however, until the data phase of the second access occurs (subsequent to t7). An accessed device of this type has an address latch, so it may complete the next address phase by latching A2 as early as t7.

Figure 19:
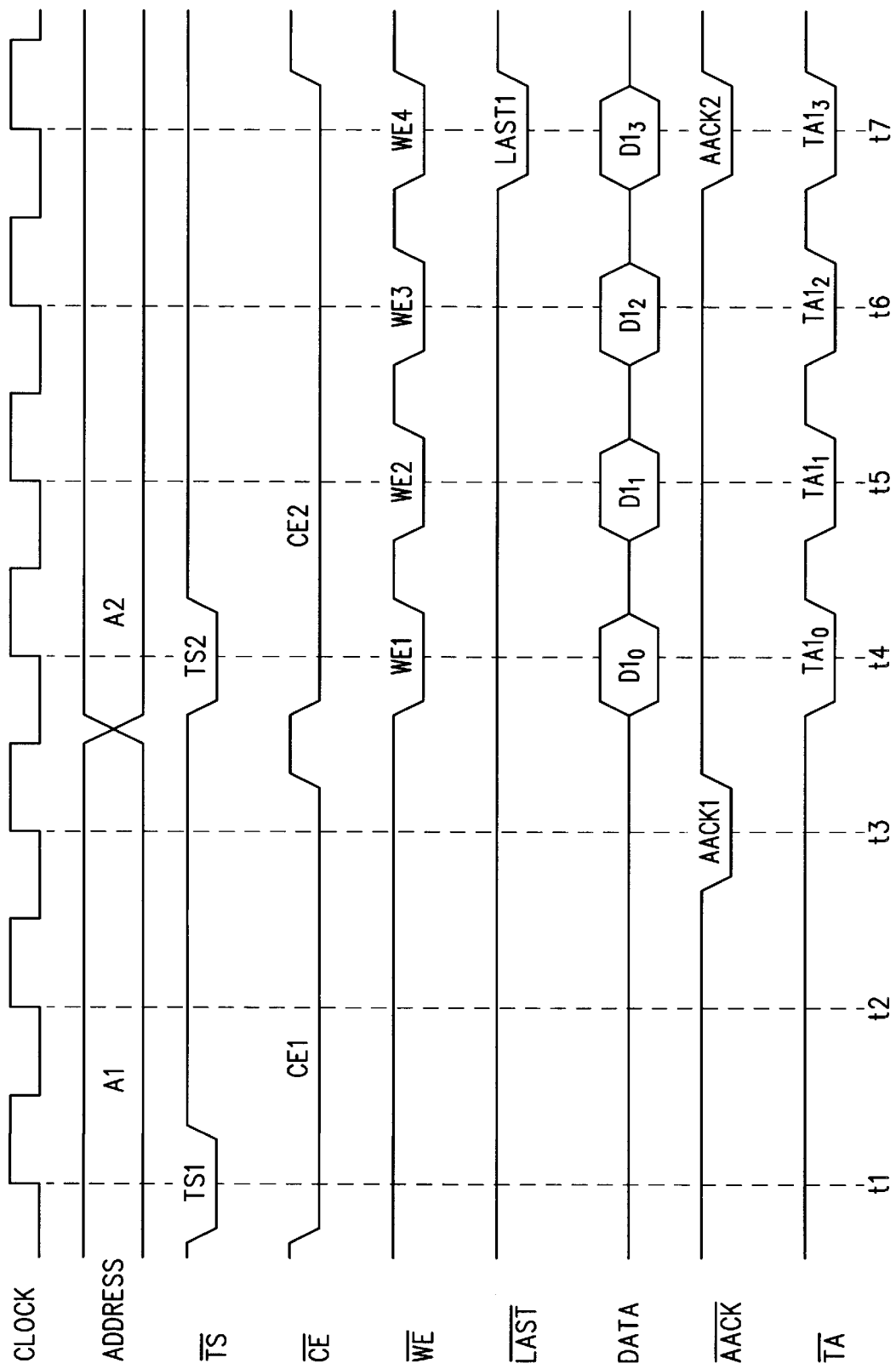

FIG. 19 illustrates a timing diagram of a write interface using access type $8. Again, the accessed device is has two wait states, and returns its own acknowledge signals, including $\overline{AACK}$ at t3 to complete the address phase of the transfer. As in a Type II burst read cycle, signal $\overline{CE}$ remains active for the duration of the device's latency, and thus $\overline{CE}$ remains active until after t3, when the data phase begins. External bus interface 33 provides data elements $D1_0$, $D1_1$, $D1_2$, and $D1_3$ on consecutive clock cycles beginning with t4, and these data elements are latched by the accessed device. The accessed device indicates termination of the data phase of each beat of the burst by the activation of signal $\overline{TA}$ on consecutive CLOCK cycles beginning with t4. As in the Type II burst read cycle, the four-beat burst transfer is completed at t7, and the completion is signaled by external bus interface 33 activating signal $\overline{\text{LAST}}$. An address phase of a subsequent cycle may be overlapped in the same manner as illustrated in FIG. 18.

Interface type $9, which is known as the "synchronous interface with synchronous $\overline{\text{OE}}$ and early overlap" interface type, performs a read access as was previously illustrated in FIG. 7. This type is similar to interface type $3 except that it overlaps the address phase of a second access with the early synchronous $\overline{\text{OE}}$ of a prior access. An interface access type $9 write access is the same as a general synchronous write access previously illustrated in FIG. 15.

Interface type $4, $6, and $A–$F are reserved. If the active control unit in timing control stage 230 detects an access to an interface with one of these reserved types, it inhibits the generation of any chip select timing control signals so that chip select generation unit 200 performs no corresponding memory access. Thus, a software error resulting in the incorrect coding of this field will not result in an illegal access.

Chip select circuit 32 is very flexible because it supports a variety of interfaces. However, the set of interfaces that chip select circuit 32 supports may vary between embodiments to accommodate different applications. In addition, chip select circuit 32 supports interfaces which allow a high degree of pipelining, increasing the performance of data processor 30. Specifically, interface access types $3, $7, and $9 greatly improve performance over known interfaces. Memory devices for use with interface access types $3, $7, and $9 may be constructed by modifying existing memory devices to conform to the timing illustrated herein using conventional sequential (clocked) circuit design techniques.

To handle overlapping accesses, early pipeline control unit 233 detects two main cases. The first case is the case of two accesses to the same region or chip, the accesses are at most allowed to overlap the next address with the first access' data phase (if the first access' latency can be determined, i.e., ACK_EN=1). For example, if the first access is to a pipelineable device, the second access to that same device will wait until the first access is ready to complete its data phase. The second access' address (or $\overline{\text{CE}}$) however can overlap with the first access' data.

The second case is for two accesses to two different regions or chips. For the second case, for overlapping accesses to two different chips or regions, timing control stage 230 enforces a set of pipelining rules to ensure data integrity and proper cycle termination. TABLE 5 below describes these rules in greater detail:

TABLE 5

| Rule No. | First Cycle | Second Cycle | Pipeline? |
|---|---|---|---|
| 1 | Read access to one region | Read access to a different region. | Yes |
| 2 | Write access | Read access | Yes |
| 3 | Single-beat write access | Write access | Yes(overlap) |
| 4 | Read access | Write access | Yes(overlap) |
| 5 | Any CS access, at least one of the first and/or second cycles to a region with ACK EN = 0 | Access to device which can hold off data. | Yes, as long as the device in a region with ACK_EN = 0 returns $\overline{\text{AACK}}$ prior to $\overline{\text{TA}}$. |
| 6 | Non CS access | CS access | No |
| 7 | Fixed burst read | Any CS access | Yes, if the second region is pipelineable and can hold off its data. |
| 8 | Synchronous region | Asynchronous region | No |
| 9 | Asynchronous region | Any access | No |

Rule no. 1 concerns a read access in one region followed by another read access to another region. In this case, chip select circuit 32 will pipeline the second read with the first read.

Rule no. 2 covers the case of a write access followed by a read access. In this case, chip select circuit 32 will pipeline the second read with the first read.

Rule no. 3 covers the case of a single beat write access followed by another write access. In this case, some devices do expect the data of the write cycle to be available one CLOCK cycle after the ADDRESS or $\overline{\text{CE}}$ is valid. If not, the device aborts the write cycle. If both accesses are terminated by chip select circuit 32 (i.e., ACK_EN is set in the option register of both regions), then chip select circuit 32 will overlap the accesses by activating the $\overline{\text{CE}}$ of the second write cycle with the last data phase of the first write cycle. For the case of a burst write followed by another write, chip select circuit 32 activates the $\overline{\text{CE}}$ for the second write cycle after the first write's indication of the last data beat ($\overline{\text{BDIP}}$ or $\overline{\text{LAST}}$) is activated.

Rule no. 4 covers the case of a read cycle followed by a write cycle. Chip select circuit 32 can overlap accesses by activating the $\overline{\text{CE}}$ of the write cycle before the read cycle has been completed. In the illustrated embodiment, however, external bus interface 33 does not provide the appropriate HANDSHAKES to chip select circuit 32 to allow this overlap. External bus interface 33 does provide the ADDRESS of the write cycle prior to the activation of the $\overline{\text{CE}}$ for the write cycle.

Rule no. 5 concerns two consecutive accesses in which the latency (i.e., number of wait states) of either access is unknown (i.e., ACK_EN is cleared). In this case, chip select circuit 32 will pipeline the two accesses only if the second access is to a region with an interface type that can hold off the data until the bus is available. For example, a first access is to a region in which ACK_EN is cleared, and the second access is to a region with interface access type $8 in which ACK_EN is set. In this case, chip select circuit 32 must hold off the second access until the first access is completed because the second region may not be able to hold off its data without an $\overline{\text{OE}}$. Note that if the first access is to a region with unknown latency and the second access is to the same region, chip select circuit 32 waits for an external $\overline{\text{AACK}}$, which allows chip select circuit 32 to activate the subsequent $\overline{\text{CE}}$ to the same region.

Rule no. 6 covers the case of a first access to a region which is not defined by chip select circuit 32, such as a dedicated dynamic RAM (DRAM) controller, and the second access is to another region defined by chip select circuit 32. In this case, the first regions provides its own chip select signals, so the interface access type and latency is not known by chip select circuit 32. Thus, chip select circuit 32 does not pipeline the second access with the first access.

Rule no. 7 covers the case of a fixed, four-beat burst read access to a burstable region, followed by a read to another region. In this case, chip select circuit 32 pipelines the second read if the second access is to a region which is pipelineable and can hold off its data. Note that if the second region has an interface access type of $8, it cannot hold off its data and chip select circuit 32 will not pipeline the second access.

Rule no. 8 covers a first access to a synchronous region, followed by a second access to an asynchronous region. In this case, chip select circuit 32 does not pipeline the second access since the second region is not pipelineable.

Rule no. 9 covers a first access to an asynchronous region. In this case, chip select circuit 32 does not pipeline the second access with the first, since both the external address and data bus must be available for the first access until its completion.

Note that both chip select circuit 32 and external bus interface 33 combine to implement these pipelining rules. In some case, external bus interface 33 controls. For rule no. 4, as noted above in conjunction with the description of FIG. 15, chip select circuit 32 supports pipelining but external bus interface 33 does not. External bus interface 33 also does not provide the $\overline{\text{AACK}}$ or $\overline{\text{TA}}$ HANDSHAKES early enough to allow pipelining for Rule no. 9. In the other cases, chip select circuit 32 recognizes incompatible accesses.

Pin Configuration Stage 240

Pin configuration stage 240 includes thirteen pin configuration logic circuits, including representative pin configuration logic circuits 241, 242, 243, and 248. Each pin configuration logic circuit has a first input connected to DECODE BUS 201, a second input connected to TIMING BUS 202, and an output for providing a dedicated chip select signal. Pin configuration logic circuit 241 provides an output signal labelled "CSBOOT". Pin configuration logic circuit 242 provides an output signal labelled "CS0" or alternatively "CSBOOT $\overline{\text{OE}}$". Pin configuration logic circuit 243 provides an output signal labelled "CS1". Pin configuration logic circuit 248 provides an output signal labelled "CS11".

Chip select circuit 32 provides the chip select signals programmably through thirteen integrated circuit pins. However, as is conventional in highly-integrated data processors or microcontrollers, the pins are shared with other pin functions or ports of data processor 30 and are programmably selected so that the output signals can be configured for different end-use applications.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. A method for synchronously accessing memory, comprising the steps of:

providing a first address for a first memory access during a first clock period;

activating a first control signal indicating an address phase of said first memory access during said first clock period;

activating a second control signal indicating a data phase of said first memory access during a second clock period subsequent to said first clock period;

receiving a first data element accessed by said first address during a third clock period immediately subsequent to said second clock period;

providing a second address for a second memory access during said third clock period; and activating said first control signal indicating an address phase of said second memory access during said third clock period.

2. The method of claim 1 wherein the step of activating said second control signal comprises the step of:

activating said second control signal during said second clock period subsequent to said first clock period by a predetermined number of wait states.

3. The method of claim 1 wherein said step of activating said first control signal comprises the step of activating a chip enable control signal.

4. The method of claim 2 wherein said step of activating said second control signal comprises the step of activating an output enable control signal.

5. The method of claim 1 further comprising the steps of:

activating a third control signal indicative of a burst data cycle in progress during said third clock period; and receiving a second data element during a fourth clock period subsequent to said third clock period.

6. The method of claim 1 further comprising the steps of:

activating a third control signal indicative of a burst data cycle in progress during a first plurality of clock periods including said third clock period; and receiving a plurality of burst data elements during a second plurality of clock periods subsequent to said third clock period and corresponding to said first plurality of clock periods.

7. The method of claim 1 wherein said step of providing said first address during said first clock period comprises the step of providing said first address at least a first predetermined setup time before first predetermined transition of a clock signal, and wherein said step of activating said first control signal comprises the step of activating said first control signal at least a second predetermined setup time before a second predetermined transition of said clock signal.

8. A method for synchronously accessing memory, comprising the steps of:

providing a first address for a first memory access at least a first predetermined setup time before a first transition of a clock signal;

activating a chip enable signal for said first memory access at least a second predetermined setup time before said first transition of said clock signal;

activating an output enable signal indicating a data phase of said first memory access a third predetermined setup time before a second transition of said clock signal subsequent to said first transition of said clock signal;

receiving a first data element accessed by said first address at a third transition of said clock signal subsequent to said second transition of said clock signal;

providing a second address for a second memory access at least said first predetermined setup time before said third transition of said clock signal; and activating said first control signal indicating an address phase of said second memory access at least said second predetermined setup time before said third transition of said clock signal.

9. The method of claim 8 wherein said step of activating said output enable signal comprises the step of:

activating said output enable signal said third predetermined setup time before said second transition of said clock signal subsequent to said first transition of said clock signal by a predetermined number of wait states.

10. The method of claim 8 further comprising the steps of:

activating a burst data cycle in progress control signal a fourth predetermined setup time before a first plurality of transitions of said clock signal including said third transition of said clock signal; and receiving a plurality of burst data elements during a second plurality of transitions of said clock signal subsequent to said third transition of said clock signal and corresponding to said first plurality of transitions of said clock signal.

11. A method for an integrated circuit microprocessor to synchronously access memory, comprising the steps of:

driving a first address for a first memory access during a first clock period;

activating a first control signal indicating a data phase of said first memory access during a second clock period subsequent to said first clock period by a predetermined number of wait states; and receiving and latching a first data element accessed by said first address during a third clock period immediately subsequent to said second clock period;

driving a second address for a second memory access during said third clock period; and activating said first control signal indicating an address phase of said second memory access during said third clock period.

12. The method of claim 11 wherein the step of activating said second control signal comprises the step of:

activating said second control signal during said second clock period subsequent to said first clock period by a predetermined number of wait states.

13. The method of claim 11 wherein said step of activating said first control signal comprises the step of activating a chip enable control signal.

14. The method of claim 11 wherein said step of activating said second control signal comprises the step of activating an output enable control signal.

15. The method of claim 11 further comprising the steps of:

activating a third control signal indicative of a burst data cycle in progress during said third clock period; and receiving and latching a second data element during a fourth clock period subsequent to said third clock period.

16. The method of claim 11 further comprising the steps of:

activating a third control signal indicative of a burst data cycle in progress during a first plurality of clock periods including said third clock period; and receiving and latching a plurality of burst data elements during a second plurality of clock periods subsequent to said third clock period and corresponding to said first plurality of clock periods.

17. The method of claim 11 wherein said step of driving said first address during said first clock period comprises the step of driving said first address at least a first predetermined setup time before first predetermined transition of a clock signal, and wherein said step of activating said first control signal comprises the step of activating said first control signal at least a second predetermined setup time before a second predetermined transition of said clock signal.

* * * * *